United States Patent
Cross et al.

(10) Patent No.: US 10,595,106 B2
(45) Date of Patent: Mar. 17, 2020

(54) SPEAKER BRACKET

(71) Applicant: Mitek Corp,. Inc., Phoenix, AZ (US)

(72) Inventors: Alan Cross, Monroe, WI (US); Kevin J. Sykes, Tempe, AZ (US); Chad A Kautz, Lena, IL (US)

( * ) Notice: Subject to any disclaimer, the term of this patent is extended or adjusted under 35 U.S.C. 154(b) by 0 days.

(21) Appl. No.: 15/009,487

(22) Filed: Jan. 28, 2016

(65) Prior Publication Data

US 2017/0223439 A1    Aug. 3, 2017

(51) Int. Cl.
| | |
|---|---|
| H04R 1/02 | (2006.01) |
| F16M 13/02 | (2006.01) |
| F16B 2/08 | (2006.01) |
| F16B 2/06 | (2006.01) |
| B62J 11/00 | (2020.01) |

(52) U.S. Cl.
CPC .............. *H04R 1/026* (2013.01); *B62J 11/00* (2013.01); *F16B 2/065* (2013.01); *F16B 2/08* (2013.01); *F16M 13/022* (2013.01); *H04R 2201/025* (2013.01)

(58) Field of Classification Search
CPC .... H04R 1/026; H04R 2201/025; B62J 11/00; F16L 3/237; F16L 21/065; F16L 33/04; F16L 3/1008; F16L 3/105; F16L 3/1016; F16L 3/10; F16M 13/022; F16B 2/065; F16B 2/08; F41G 11/001; F41G 11/004
USPC .... 248/62, 74.1, 74.3, 229.1, 229.17, 230.1, 248/230.8, 214, 276.1, 278.1, 284.1, 67.7, 248/68.1, 69, 70, 313, 65, 219.4, 74.4; 403/385; 24/279
See application file for complete search history.

(56) References Cited

U.S. PATENT DOCUMENTS

| | | | | |
|---|---|---|---|---|
| 2,010,058 A | * | 8/1935 | Carlson | B62J 6/02 362/396 |
| 2,549,346 A | * | 4/1951 | Tormo | F16L 3/14 248/58 |
| 2,828,525 A | * | 4/1958 | Gail | F16L 32/08 24/279 |
| 3,305,199 A | * | 2/1967 | Bayes | F16L 3/127 248/74.1 |
| 3,505,761 A | * | 4/1970 | Prieur | A01G 17/12 24/279 |
| 3,835,565 A | * | 9/1974 | Weast | F41G 11/003 42/90 |
| 3,905,623 A | * | 9/1975 | Cassel | E02B 11/005 285/382 |
| 4,004,768 A | * | 1/1977 | Evans | F01N 13/1822 248/59 |

(Continued)

*Primary Examiner* — Ingrid M Weinhold
(74) *Attorney, Agent, or Firm* — Keith L. Jenkins, Registered Patent Attorney, LLC; Keith L. Jenkins

(57) ABSTRACT

A strap clamp style speaker bracket with a fastener base that can be used for straps of many different sizes. The invention also includes the previously mentioned speaker bracket with a similarly shaped fastener base with a dual pivoting linkage to a second strap clamp style speaker bracket for a unique cylindrical speaker. The clamp base has semi-cylindrical grooves on opposing sides and the strap ends have conformal semi-cylindrical protrusions that fit in the grooves. A bolt through the protrusions and grooves and the clamp block secures the clamp. A cylindrical speaker is illustrated. Another embodiment has legs extending from the clamp block to receive a pivot block which provides a dual articulatible speaker support.

16 Claims, 19 Drawing Sheets

(56) References Cited

U.S. PATENT DOCUMENTS

| | | | | |
|---|---|---|---|---|
| 4,364,588 A * | 12/1982 | Thompson | F16L 21/06 | 138/99 |
| 4,465,252 A * | 8/1984 | Donovan, Jr. | F16L 3/20 | 248/589 |
| 4,817,897 A * | 4/1989 | Kreusel | E04B 1/585 | 248/68.1 |
| 4,860,480 A * | 8/1989 | Ruger | F41G 11/003 | 42/124 |
| 5,010,626 A * | 4/1991 | Dominguez | F16L 33/04 | 24/279 |
| D335,079 S * | 4/1993 | Sachs | D8/396 | |
| 5,271,648 A * | 12/1993 | Krausz | F16L 55/16 | 24/279 |
| D353,986 S * | 1/1995 | Maglica | D12/114 | |
| 5,797,697 A * | 8/1998 | Keller | F16B 7/0493 | 248/74.1 |
| 6,701,660 B2 * | 3/2004 | Stover | F41G 11/003 | 42/124 |
| 6,938,865 B1 * | 9/2005 | Day | B60R 11/02 | 248/229.14 |
| 7,231,694 B2 * | 6/2007 | Ignaczak | F16L 21/065 | 24/279 |
| 7,240,883 B2 * | 7/2007 | Liao | F21L 4/00 | 248/278.1 |
| 7,401,753 B2 * | 7/2008 | Bozmoski | F01N 13/1805 | 248/316.1 |
| 7,461,827 B2 * | 12/2008 | Rivers | A45F 5/00 | 248/201 |
| 8,136,771 B2 * | 3/2012 | Cazalet | F16L 3/10 | 248/58 |
| 2006/0131467 A1 * | 6/2006 | Wang | F16M 11/105 | 248/276.1 |
| 2007/0266611 A1 * | 11/2007 | Stover | F41G 11/003 | 42/124 |

\* cited by examiner

SPEAKER BRACKET

RELATED APPLICATIONS

This application claims the benefit of U.S. provisional patent application Ser. No. 62/191,316 filed Jul. 10, 2015 to the same inventors.

FIELD OF ART

The present invention relates to speaker bracket that connects a loudspeaker (hereinafter "speaker") to a tubular or cylindrical support.

BACKGROUND OF THE INVENTION

Speakers for outdoor use, including marine and automotive embodiments, can often most conveniently be attached to a tubular or cylindrical support, such as a wake board tow bar, handle bars, roll bars, and the like. Available brackets have particular drawbacks making it inconvenient to use them or results in unreliable attachment of the speaker.

SUMMARY OF THE INVENTION

Briefly described, the invention includes a strap clamp style speaker bracket with a unique fastener base that can be used for straps of many different sizes. The invention also includes the previously mentioned speaker bracket with a similarly shaped fastener base with a dual pivoting linkage to a second strap clamp style speaker bracket for a unique cylindrical speaker.

An exemplary embodiment provides a speaker bracket including: a clamp base having first and second semi-cylindrical grooves on first and second opposing sides, respectively; first and second arms, adapted to receive a support, extending from first and second opposing ends of a third side of the clamp base, where the third side extends between the first and second opposing sides; a fourth side, opposed to the third side, and extending between the first and second opposing sides; a resilient arcuate clamp strap including opposing first and second clamping ends, further including respective first and second semi-cylindrical protrusions adapted to conform to the first and second semi-cylindrical grooves, respectively; a clamp through-bore in the clamp base extending between the first and second semi-cylindrical grooves; first and second clamp strap end through-bores extending through respective first and second semi-cylindrical protrusions and alignable to the clamp through-bore in a clamping configuration; an at least partially threaded clamp bolt, sized to slidingly fit through the first clamp strap end through-bore, the clamp through-bore, and the second clamp strap end through-bore and to be fastened with a nut; and first and second flat surfaces on the first and second opposing sides and adjacent to and on first and second opposed sides of: first and second semi-cylindrical grooves; and first and second semi-cylindrical protrusions. That speaker bracket, further including: a plurality of threaded fastener holes in the fourth side extending inwardly no further than to the clamp through-bore; an adaptor: fastenable to the clamp base via a plurality of screws into the respective plurality of threaded fastener holes; and having at least one arcuate slot adapted to receive fasteners for fastening the adapter to at least one of a loudspeaker, a loudspeaker housing, and a loudspeaker frame. That first-mentioned speaker bracket, further including: first and second legs extending perpendicularly from opposing ends of the fourth side of the clamp block; the first and second legs having respective first and second rounded ends; first and second pivot bores in respective first and second legs; a pivot block configured to slidingly rotate between the first and second legs and having: a semi-cylindrical portion proximate the clamp block; a flat-sided portion extending distally from the semi-cylindrical portion; a pivot block through-bore alignable with the first and second pivot bores; a fastener access bore oriented transverse to the pivot block through-bore; a fastener divot at an opening of the fastener access bore, proximal the clamp block; a narrowed receiver portion of the fastener access bore; an at least partially threaded pivot bolt sized to slidingly fit through the first leg through-bore, the pivot block through-bore, and the second leg through-bore and adapted to be either tightly fastened for clamping or loosely fastened for pivoting; a speaker strap further including: a strap base, a strap extending from the strap base, and a strap end extending from the strap, all including one piece; a strap base fastener bore in the strap base alignable to a strap end fastener bore in the strap end for receiving a first fastener adapted to clamp the strap end to the strap base; a strap end fastener recess in the strap end adapted to receive a head of the first fastener; a smooth strap base bore through the strap base oriented transverse to the strap base fastener bore; a recess in the strap base at an end of the smooth strap base through-bore proximate the strap; an at least partially threaded set screw bore extending into a side of the strap base to the smooth strap base through-bore; a smooth cylinder configured to slidingly rotate within the smooth strap base through-bore, further including: a head portion of wider diameter than the smooth cylinder, configured to slidingly rotate within the recess; a threaded central axial bore within the smooth cylinder; the first fastener adapted to extend through the strap end through-bore and into the strap base fastener bore; a second fastener adapted to extend from the narrowed receiver portion of the fastener access bore to engage the threaded central axial bore within the smooth cylinder; and a set screw, adapted to be engaged in the set screw bore to either prevent the smooth cylinder from rotating or allow the smooth cylinder to rotate.

The disclosure of the invention provides a speaker bracket including: a clamp base having first and second semi-cylindrical grooves on first and second opposing sides, respectively; first and second arms, adapted to receive a support, extending from first and second opposing ends of a third side of the clamp base, where the third side extends between the first and second opposing sides; a fourth side, opposed to the third side, and extending between the first and second opposing sides; a resilient arcuate clamp strap including opposing first and second clamping ends, further including respective first and second semi-cylindrical protrusions adapted to conform to the first and second semi-cylindrical grooves, respectively; a clamp through-bore in the clamp base extending between the first and second semi-cylindrical grooves; first and second clamp strap end through-bores extending through respective first and second semi-cylindrical protrusions and alignable to the clamp through-bore in a clamping configuration; and an at least partially threaded clamp bolt, sized to slidingly fit through the first clamp strap end through-bore, the clamp through-bore, and the second clamp strap end through-bore and to be fastened with a nut; and first and second flat surfaces on the first and second opposing sides and adjacent to and on first and second opposed sides of: first and second semi-cylindrical grooves; first and second semi-cylindrical protrusions. The speaker bracket, including: a plurality of threaded fastener holes in the fourth side extending inwardly no further than to the clamp through-bore; an adaptor: fastenable to the clamp base via a plurality of screws into the respective plurality of threaded fastener holes; and having at least one arcuate slot adapted to receive fasteners for fastening the adapter to at least one of a loudspeaker, a loudspeaker housing, and a loudspeaker frame. The speaker bracket, including: first and second legs extending perpendicularly from opposing ends of the fourth side of the clamp block; the first and second legs having respective first and second rounded ends; first and second pivot bores in respective first and second legs; a pivot block configured to sliding rotate between the first and second legs and having; a semi-cylindrical portion proximate the clamp block; a flat-sided portion extending distally from the semi-cylindrical portion; a pivot block through-bore alignable with the first and second pivot bores; a fastener access bore oriented transverse to the pivot block through-bore; a fastener divot at an opening of the fastener access bore, proximal the clamp block; a narrowed receiver portion of the fastener access bore; an at least partially threaded pivot bolt sized to slidingly fit through the first leg through-bore, the pivot block through-bore, and the second leg through-bore and adapted to be one of tightly fastened for clamping and loosely fastened for pivoting; a speaker strap further including: a strap base, a strap extending from the strap base, and a strap end extending from the strap, all including one piece; a strap base fastener bore in the strap base alignable to a strap end fastener bore in the strap end for receiving a first fastener adapted to clamp the strap end to the strap base; a strap end fastener recess in the strap end adapted to receive a head of the first fastener; a smooth strap base bore through the strap base oriented transverse to the strap base fastener bore; a recess in the strap base at an end of the smooth strap base through-bore proximate the strap; an at least partially threaded set screw bore extending into a side of the strap base to the smooth strap base through-bore; a smooth cylinder configured to slidingly rotate within the smooth strap base through-bore, further including: a head portion of wider diameter than the smooth cylinder, configured to slidingly rotate within the recess; a threaded central axial bore within the smooth cylinder; the first fastener adapted to extend through the strap end through-bore and into the strap base fastener bore; a second fastener adapted to extend from the narrowed receiver portion of the fastener access bore to engage the threaded central axial bore within the smooth cylinder; and a set screw, adapted to be engaged in the set screw bore to one of prevent the smooth cylinder from rotating and allow the smooth cylinder to rotate.

DESCRIPTION OF THE FIGURES OF THE DRAWINGS

The present invention will hereinafter be described in conjunction with the following drawing figures, wherein like numerals denote like elements.

Figure 11:
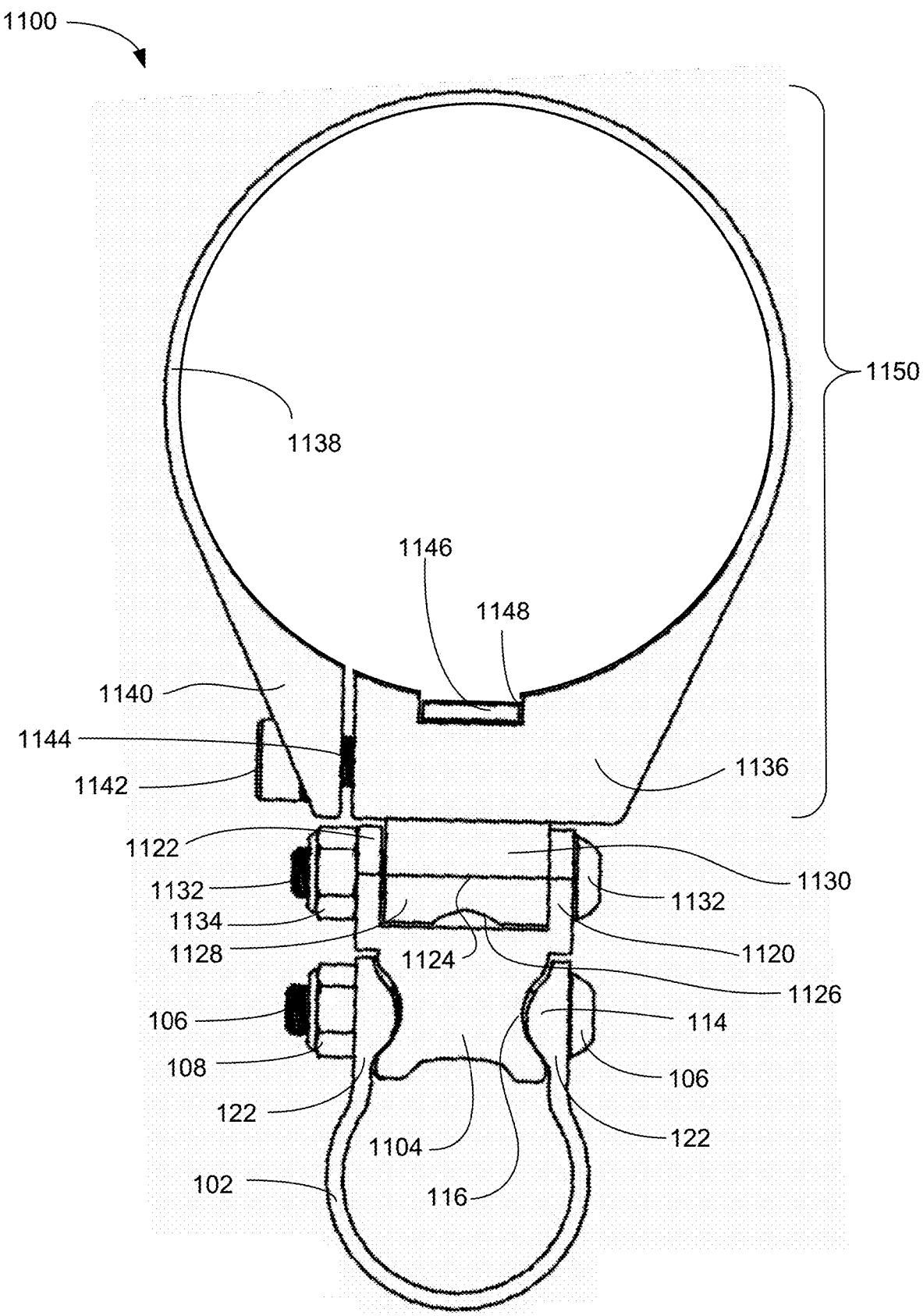
FIG. 11 is a front elevation view illustrating a second exemplary embodiment of a dual speaker bracket, according to a preferred embodiment of the present invention.
Figure 13:
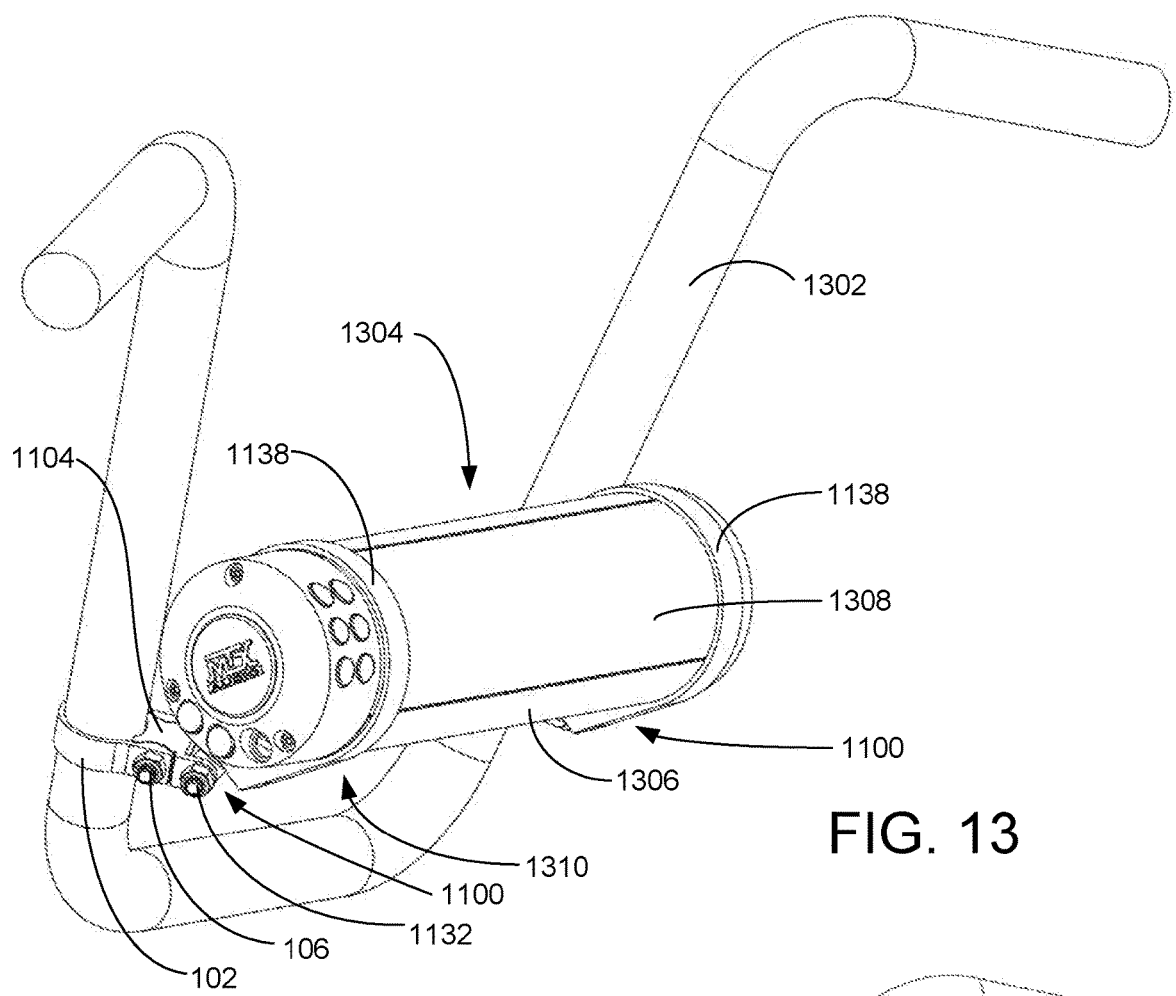
FIG. 13 is a front perspective view illustrating the second exemplary embodiment of the dual speaker bracket of FIG. 11 installed on a first type of handle bars, according to a preferred embodiment of the present invention.
Figure 20:
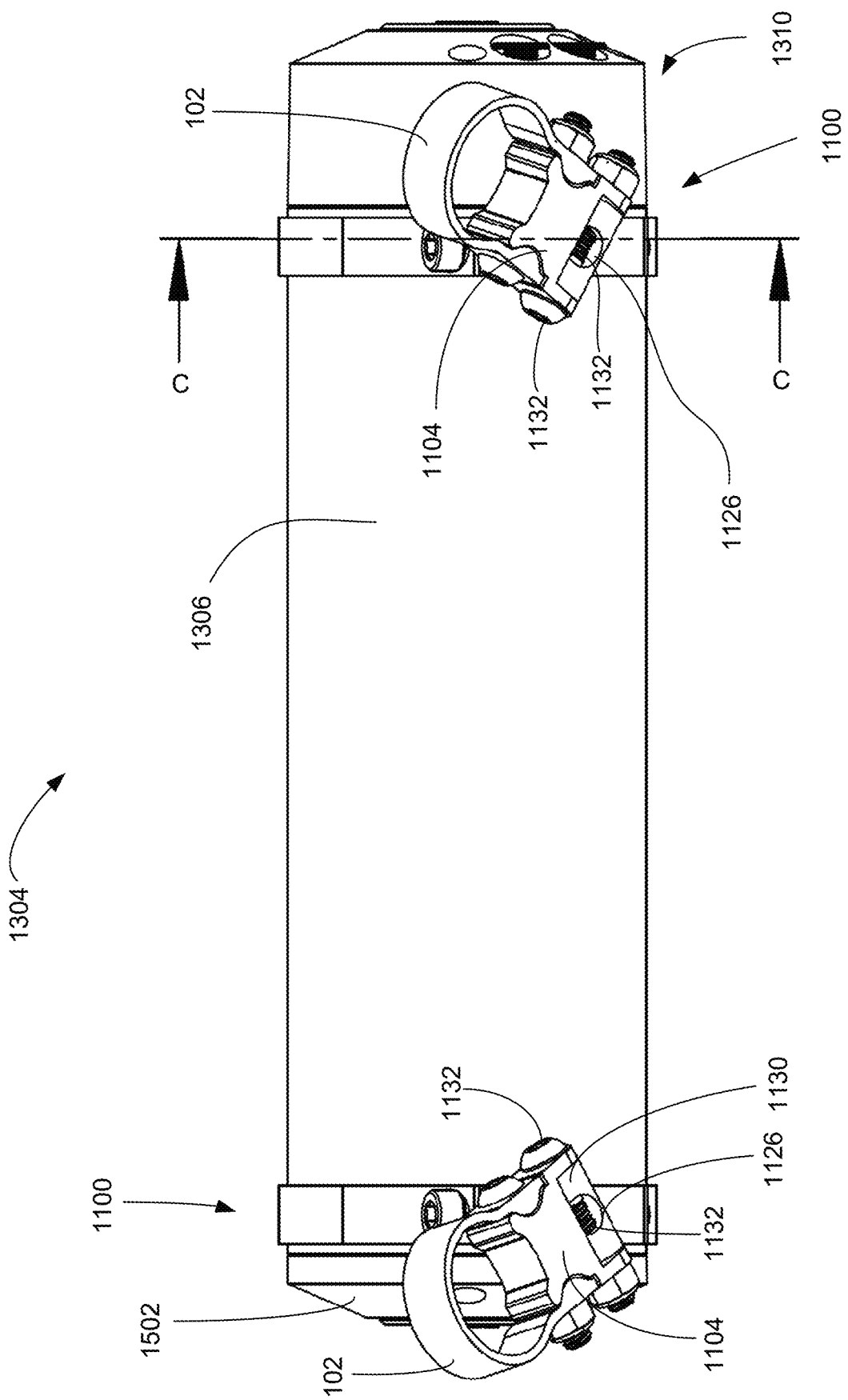
Figure 21:
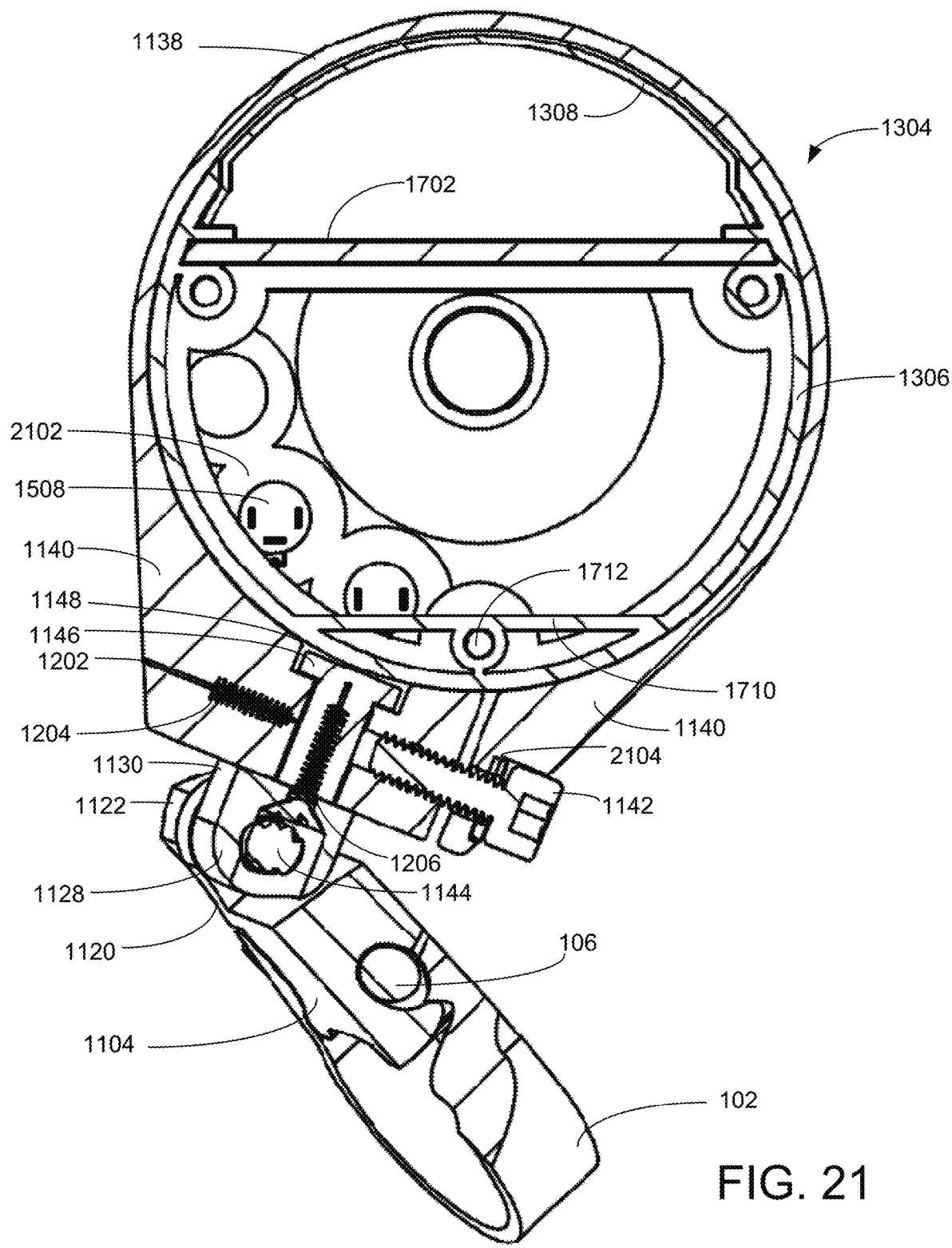

11 installed on a cylindrical speaker as shown in FIG. 13, according to a preferred embodiment of the present invention;

FIG. 20 is a bottom plan view illustrating the second exemplary embodiment of the dual speaker bracket of FIG. 11 installed on a cylindrical speaker as shown in FIG. 13 and defining cross section CC, according to a preferred embodiment of the present invention; and FIG. 21 is a cross sectional view through section CC illustrating the second exemplary embodiment of the dual speaker bracket of FIG. 11 installed on a cylindrical speaker as shown in FIG. 13, according to a preferred embodiment of the present invention.

DETAILED DESCRIPTION OF THE INVENTION

Figure 1:
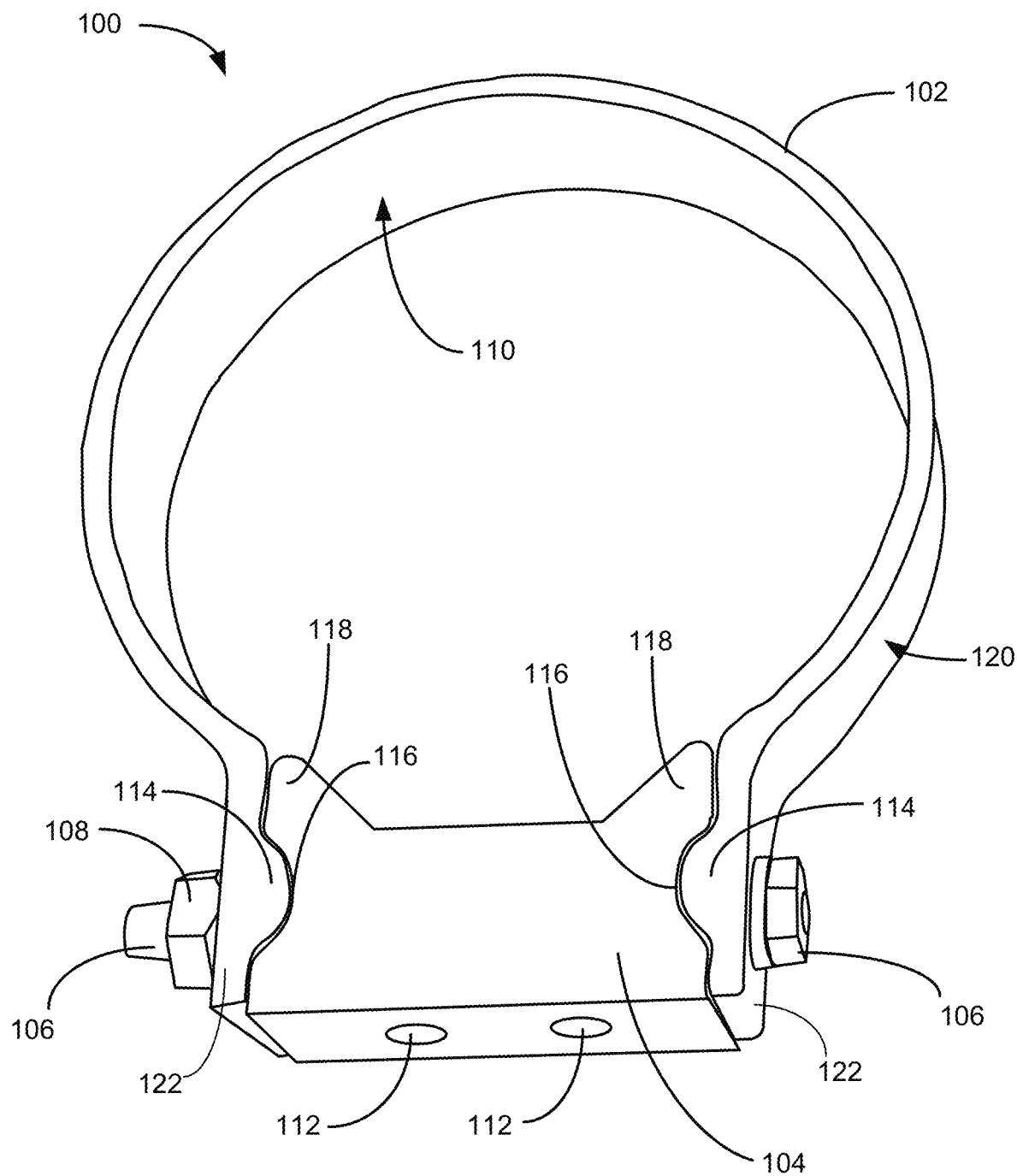
FIG. 1 is a perspective view illustrating an exemplary embodiment of the speaker bracket, according to a preferred embodiment of the present invention.

FIG. 1 is a perspective view illustrating an exemplary embodiment of the speaker bracket 100, according to a preferred embodiment of the present invention. Clamp base 104 features semi-cylindrical grooves 116 on opposing sides, and arms 118 for receiving a pipe or rod onto which the speaker bracket 100 may be attached. Resilient strap 102 has opposed clamping ends 122 featuring respective semi-cylindrical protrusions 114 that fit conformally into respective semi-cylindrical grooves 116 when installed. The internal surface 110 of resilient strap 102 engages the pipe or similar support in operation. Outer surface 120 is generally exposed to view and the environment. The clamp base 104 has a through-bore 704 (see FIG. 7) to which opposing through-bores 702 (see FIG. 7) in each opposed clamping end 122 align to receive clamp bolt 106 which is tightened using nut 108 to secure the speaker bracket 100 to a pipe, handle bar, or similar support. Adjacent to either side of the semi-cylinder grooves 116 and protrusions 114, flat surfaces of the clamping ends 122 abut flat surfaces of the clamp base 104 when the strap 102 is installed.

Figure 2:
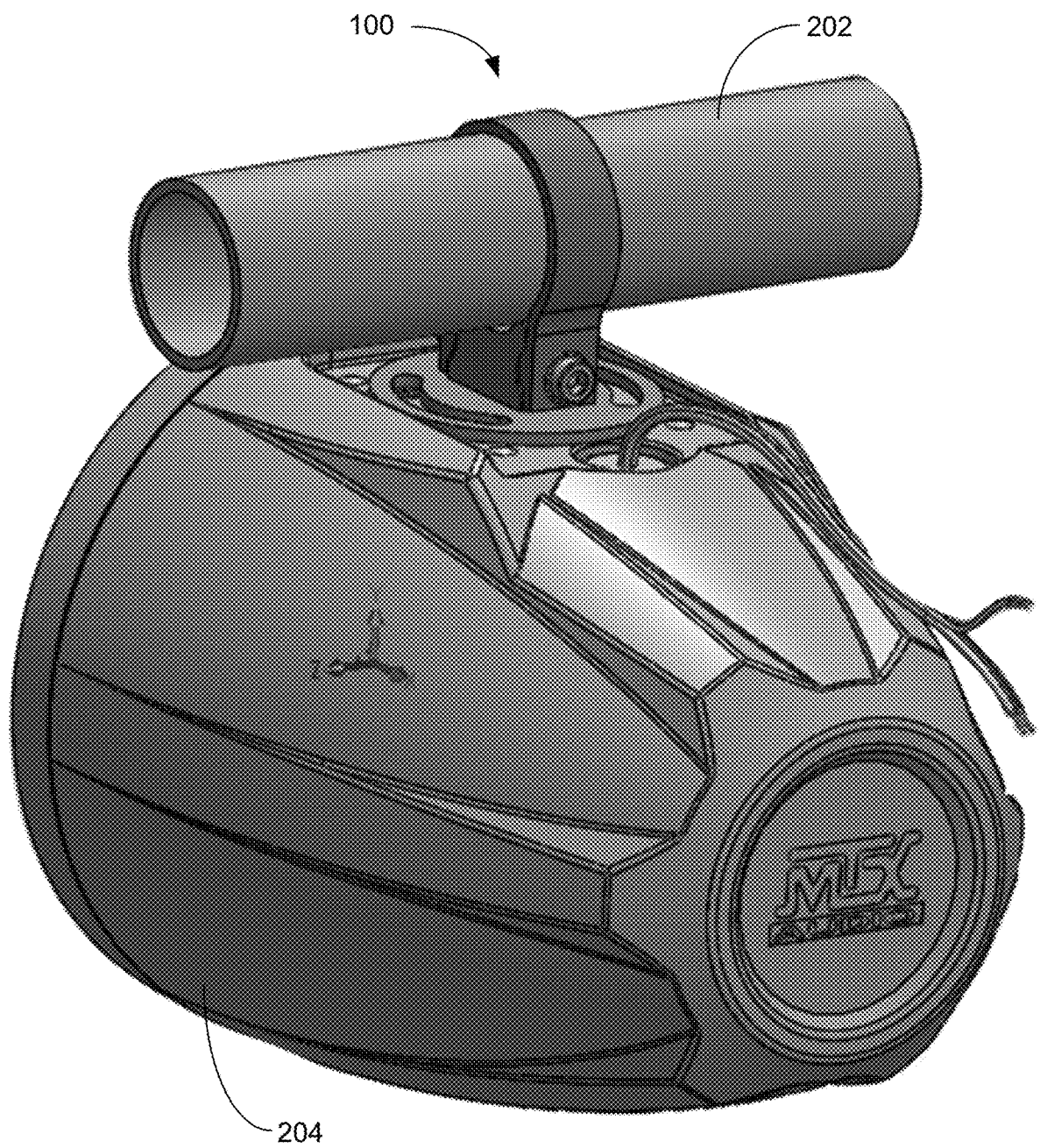
FIG. 2 is a rear perspective view illustrating the exemplary embodiment of the speaker bracket of FIG. 1 fully installed, according to a preferred embodiment of the present invention.
Figure 3:
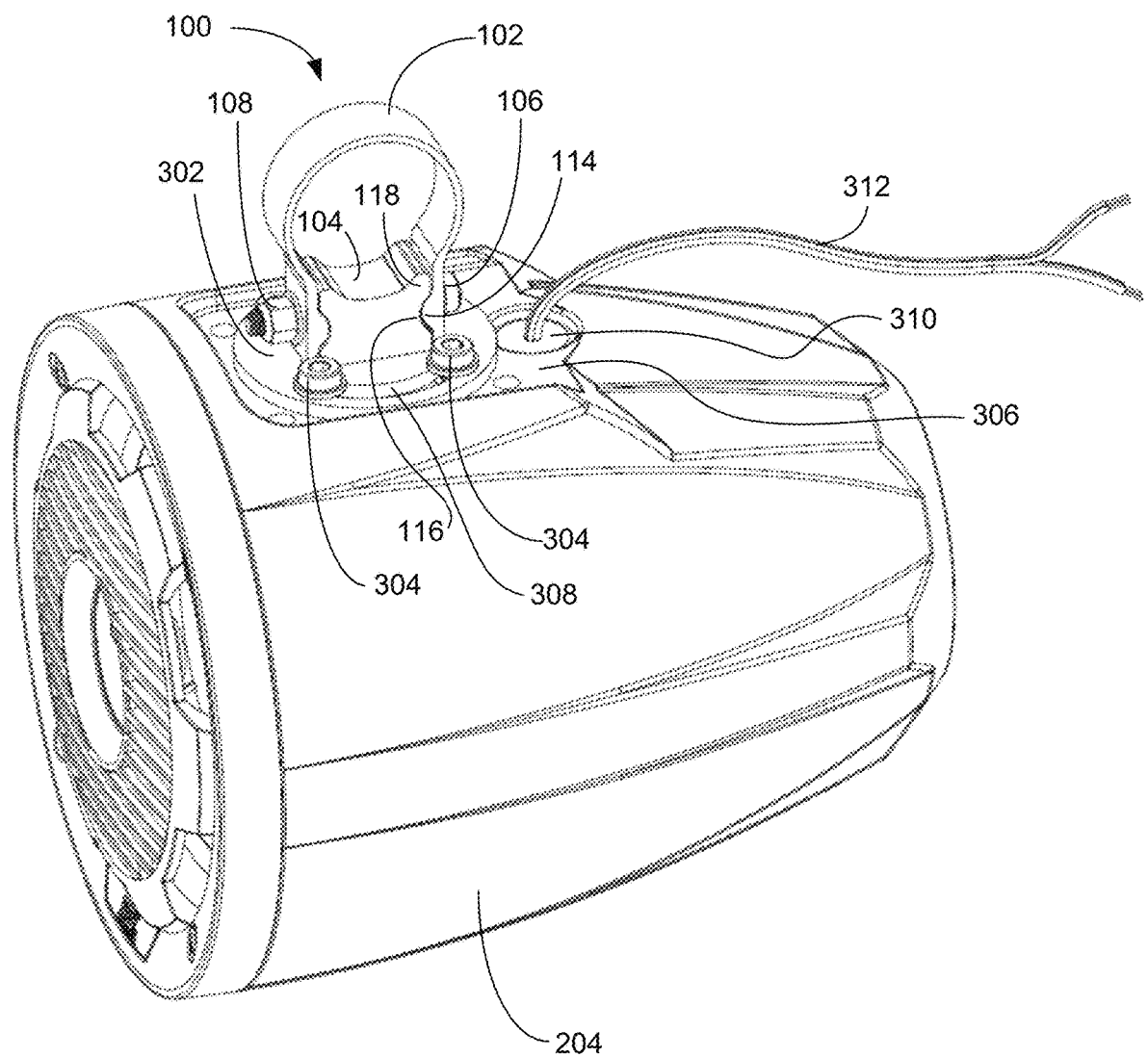
FIG. 3 is a side perspective view illustrating the exemplary embodiment of the speaker bracket of FIG. 1 installed on a speaker of FIG. 2, according to a preferred embodiment of the present invention.

The clamp base 104 also has threaded fastener holes 112 to assist in fastening the speaker bracket 100 to a speaker 204 (see FIG. 2) optionally using adapter 302 (see FIG. 3). Speaker bracket 100 is preferably made of metal. In various other embodiments, other materials may be used.

FIG. 2 is a rear perspective view illustrating the exemplary embodiment of the speaker bracket 100 of FIG. 1 fully installed, according to a preferred embodiment of the present invention. Speaker bracket 100 couples speaker 204 to support 202. Support 202 may be stage rigging, a tow bar on a wake boat, or any circular cylindrical extent of any object. In other embodiments, the support 202 may be of various cross-sectional shapes, with strap 102 conformally shaped to receive such support. While speaker 204 is a wake boat speaker 202, the invention is not limited to any one kind of speaker 204.

FIG. 3 is a side perspective view illustrating the exemplary embodiment of the speaker bracket 100 of FIG. 1 installed on the speaker 204 of FIG. 2, according to a preferred embodiment of the present invention. Adapter 302 is fastened to the bottom of clamp base 104 as will be described in further detail in regard to FIG. 7. Adaptor 302 rests on platform 306 and has arcuate slots 308 (one visible in this view) through which fasteners 304 enter into threaded fastener receivers inside speaker 204 (not shown). In other embodiments, fasteners 304 may be positioned differently in slot 308, depending on the arrangement of the fastener receivers in other speakers 204. Fastening may be to the loudspeaker housing, the loudspeaker frame, and/or the loudspeaker. Speaker 204 has a water-resistant grommet 310 in an opening in platform 306 through which audio signal wires 312 extend.

Figure 4:
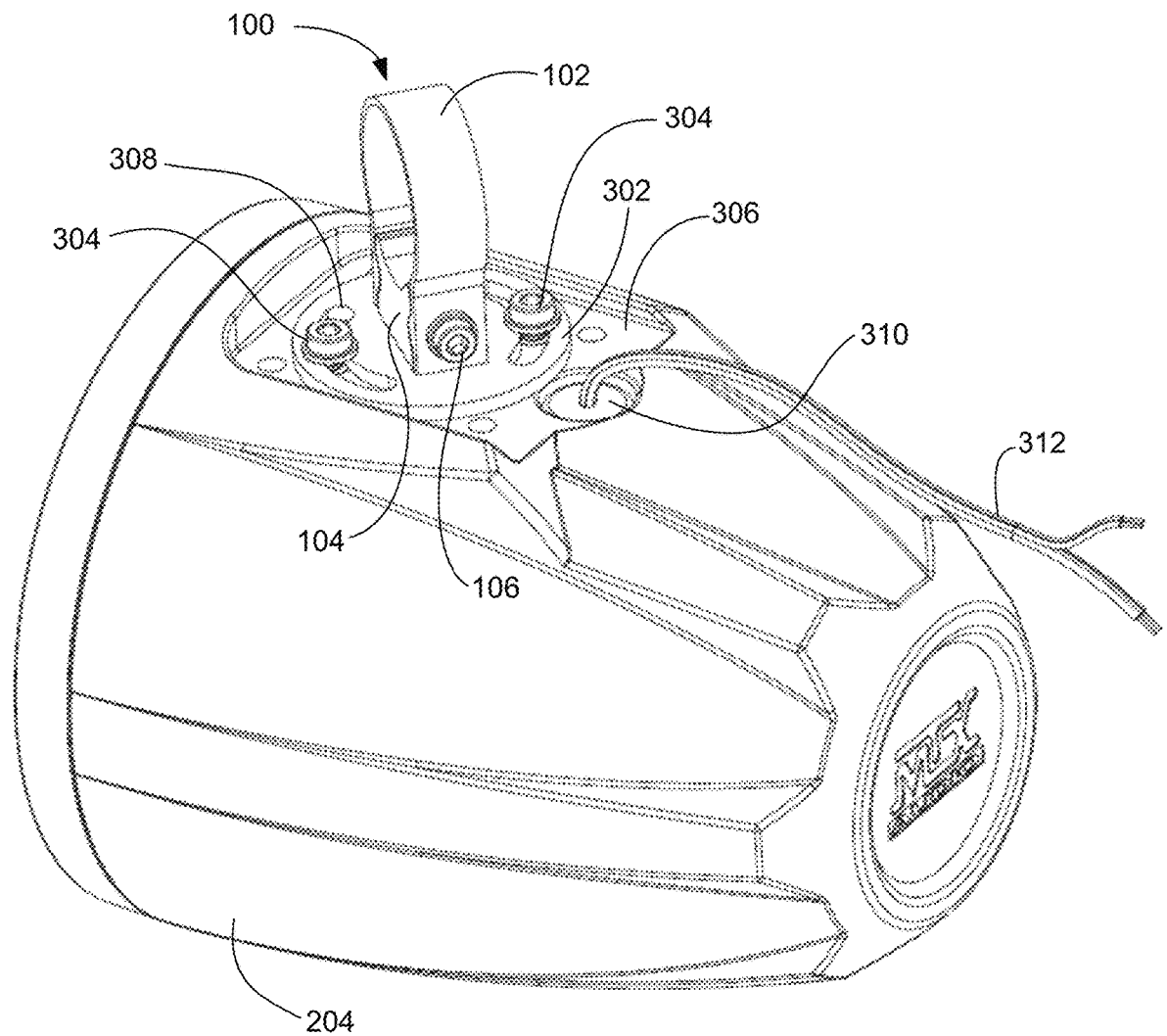
FIG. 4 is a rear perspective view illustrating an exemplary embodiment of the speaker bracket of FIG. 1 installed on a speaker of FIG. 2, according to a preferred embodiment of the present invention.

FIG. 4 is a rear perspective view illustrating an exemplary embodiment of the speaker bracket 100 of FIG. 1 installed on the speaker 204 of FIG. 2, according to a preferred embodiment of the present invention. The angle of the speaker bracket 100 to a centerline of the speaker 204 may be adjusted by rotating adapter 302 to the desired angle and securing adapter 302 in position using fasteners 304, as shown. Speaker bracket 100 is rigidly connected to adapter 302.

Figure 5:
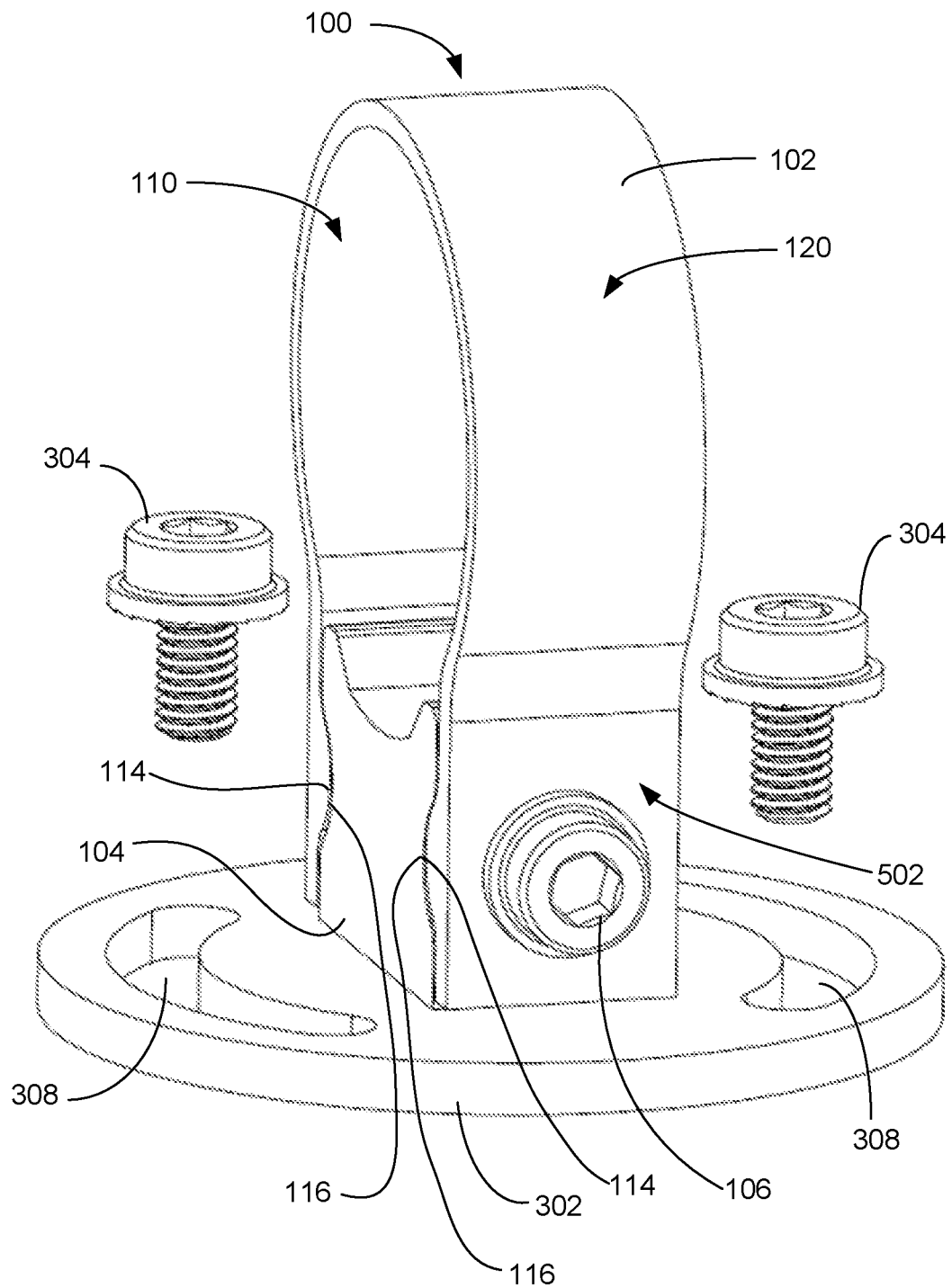
FIG. 5 is a side perspective partially exploded view illustrating the exemplary embodiment of the speaker bracket of FIG. 1 in a first installation configuration, according to a preferred embodiment of the present invention.

FIG. 5 is a side perspective partially exploded view illustrating the exemplary embodiment of the speaker bracket 100 of FIG. 1 in a first installation configuration, according to a preferred embodiment of the present invention. Fasteners 304 may be inserted through slots 308 at any place along the length of slots 308. Exterior surface 502 (one of two visible in this view) of clamping ends 122 are preferably flat exterior surfaces 502.

Figure 6:
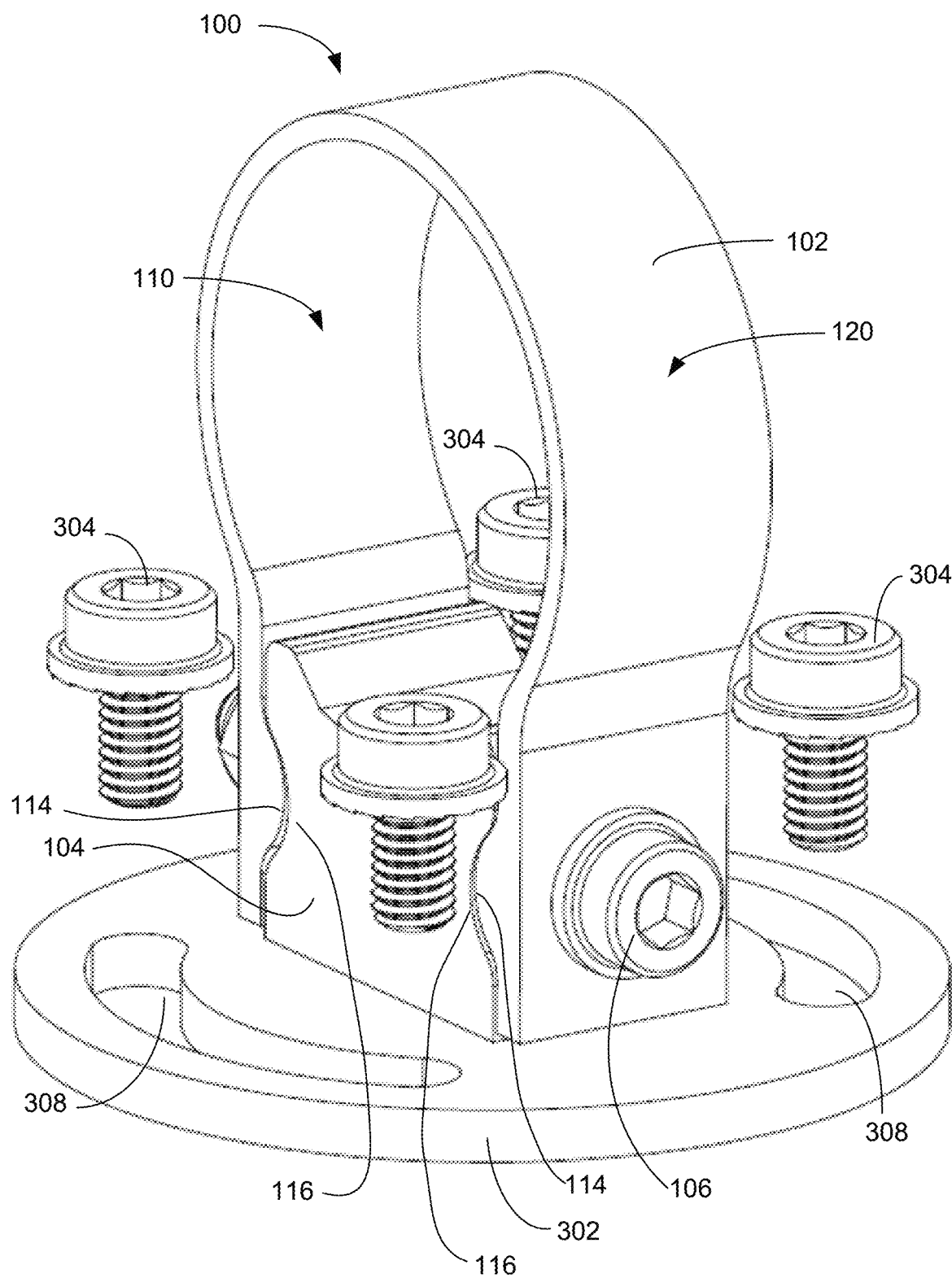
FIG. 6 is a side perspective partially exploded view illustrating the exemplary embodiment of the speaker bracket of FIG. 1 in a second installation configuration, according to a preferred embodiment of the present invention.

FIG. 6 is a side perspective partially exploded view illustrating the exemplary embodiment of the speaker bracket 100 of FIG. 1 in a second installation configuration, according to a preferred embodiment of the present invention. In this embodiment, four fasteners 304 are used to secure adapter 302 to a speaker. Clamp bolt 106 is shown with an Allen wrench socket in the head of the fastener 106. The number of the fasteners 304 may vary according to the application (weight of the speaker, dynamic loads in the environment, etc.).

Figure 7:
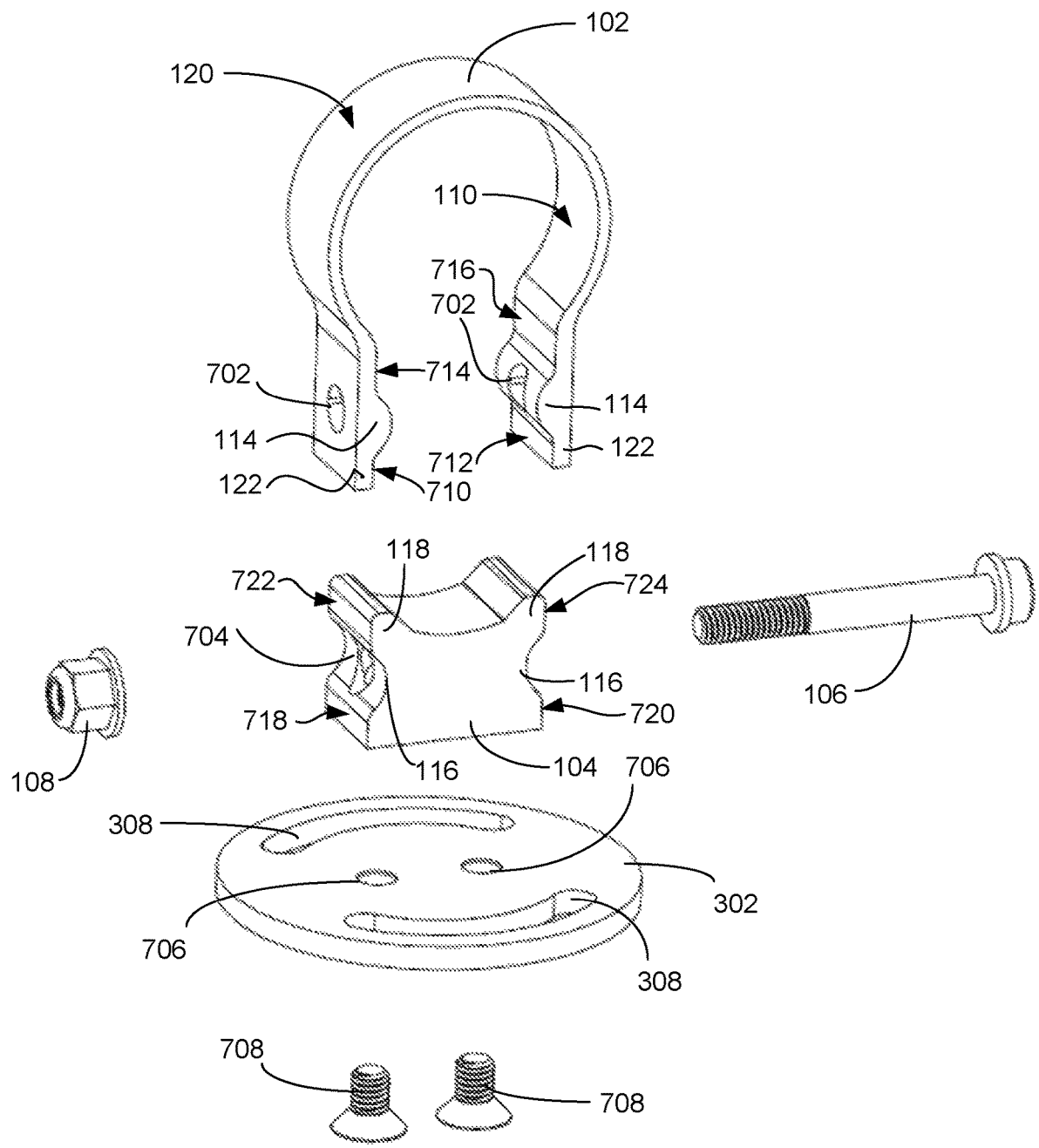
FIG. 7 is a front perspective exploded view illustrating the exemplary embodiment of the speaker bracket of FIG. 1, according to a preferred embodiment of the present invention.

FIG. 7 is a front perspective exploded view illustrating the exemplary embodiment of the speaker bracket 100 of FIG. 1, according to a preferred embodiment of the present invention. Adapter fasteners 708 extend through adapter fastener openings 706 into threaded fastener bores 112 to rigidly connect clamp base 104 to adapter 302. Clamp bolt 106 extends through aligned bores 702 and 704 and into nut 108. Tightening nut 108 supplies compression to strap ends 122 against the sides of clamp base 104. In various other embodiments, adapter 302 may be modified as to shape, responsive to speaker design. Resilient strap 102 has first and second flat surfaces 710, 714 and 712, 716 on said first and second opposing sides of and adjacent to first and second semi-cylindrical protrusions 114. Clamp base 104 has first and second flat surfaces 718, 722 and 720, 724 on said first and second opposing sides of and adjacent to first and second semi-cylindrical grooves 116. The flat surfaces 710, 714 and 712, 716 on the strap ends 122 of the resilient strap 102 are conformal to the flat surfaces 718, 722 and 720, 724, respectively. In a particular embodiment, some variation from flatness may be used.

Figure 8:
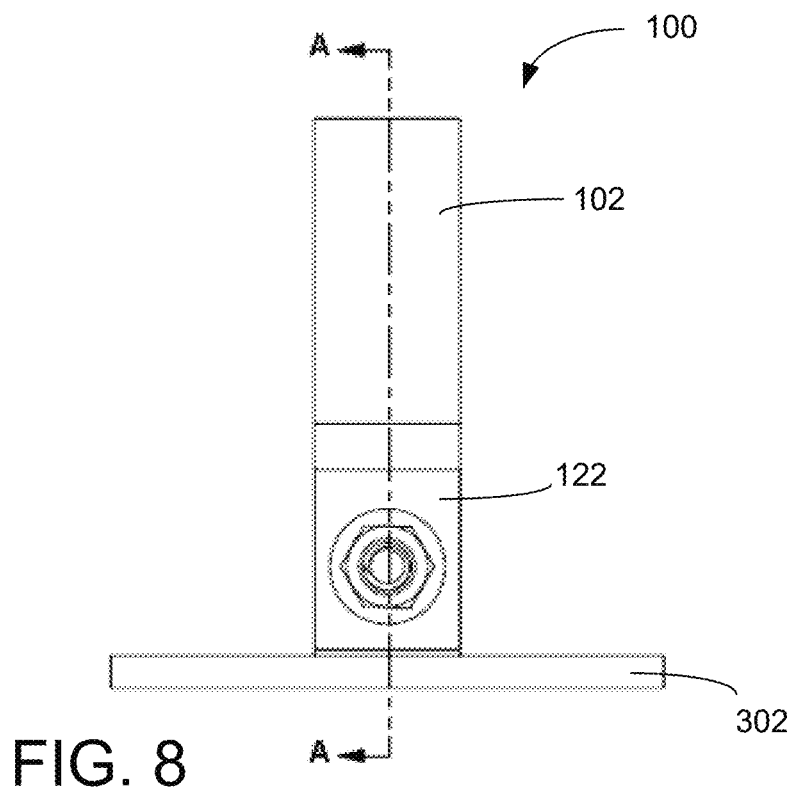
FIG. 8 is a side elevation view illustrating the exemplary embodiment of the speaker bracket of FIG. 1 and defining a cross-section AA, according to a preferred embodiment of the present invention.

FIG. 8 is a side elevation view illustrating the exemplary embodiment of the speaker bracket 100 of FIG. 1 and defining a cross-section AA, according to a preferred embodiment of the present invention. The width of strap 102, strap ends 122, and clamp base 104 are preferably equal. In other embodiments, strap 102 may not have a uniform width.

Figure 9:
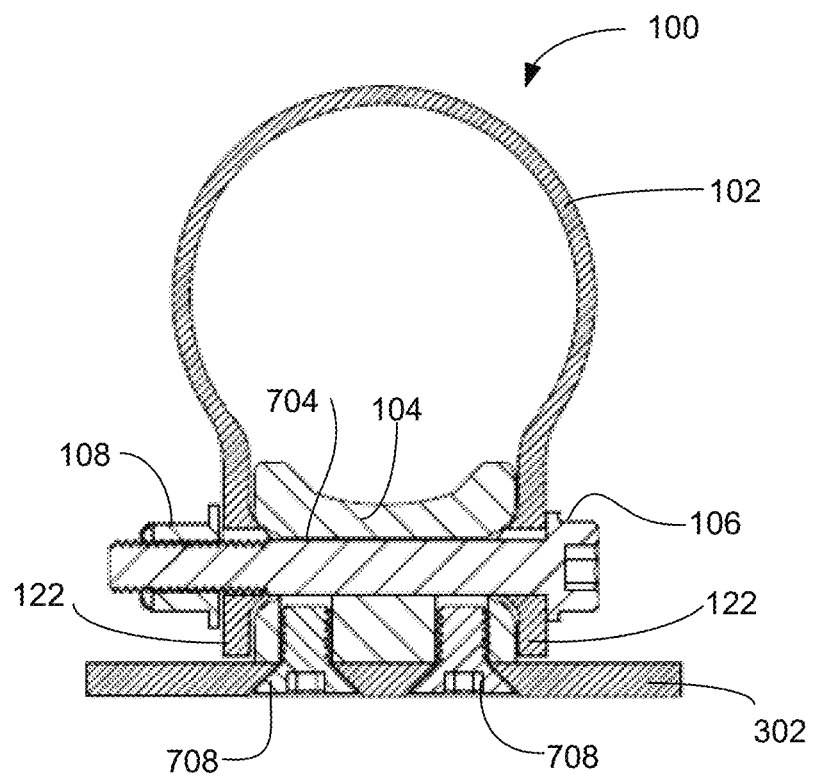
FIG. 9 is a front elevation view through cross section AA illustrating the exemplary embodiment of the speaker bracket of FIG. 1, according to a preferred embodiment of the present invention.

FIG. 9 is a front elevation view through cross section AA illustrating the exemplary embodiment of the speaker bracket 100 of FIG. 1, according to a preferred embodiment of the present invention. The relationship between adapter fasteners 708 and clamp bolt 106 is such that the adapter fasteners 708 do not extend into clamp bolt 106. The heads of adapter fasteners 708 are counter sunk into the bottom of adapter 302 to avoid damaging the speaker, when installed.

Note that strap ends 122 do not make contact with adapter 302. In another embodiment, strap ends 122 may abut adapter 302.

Figure 10:
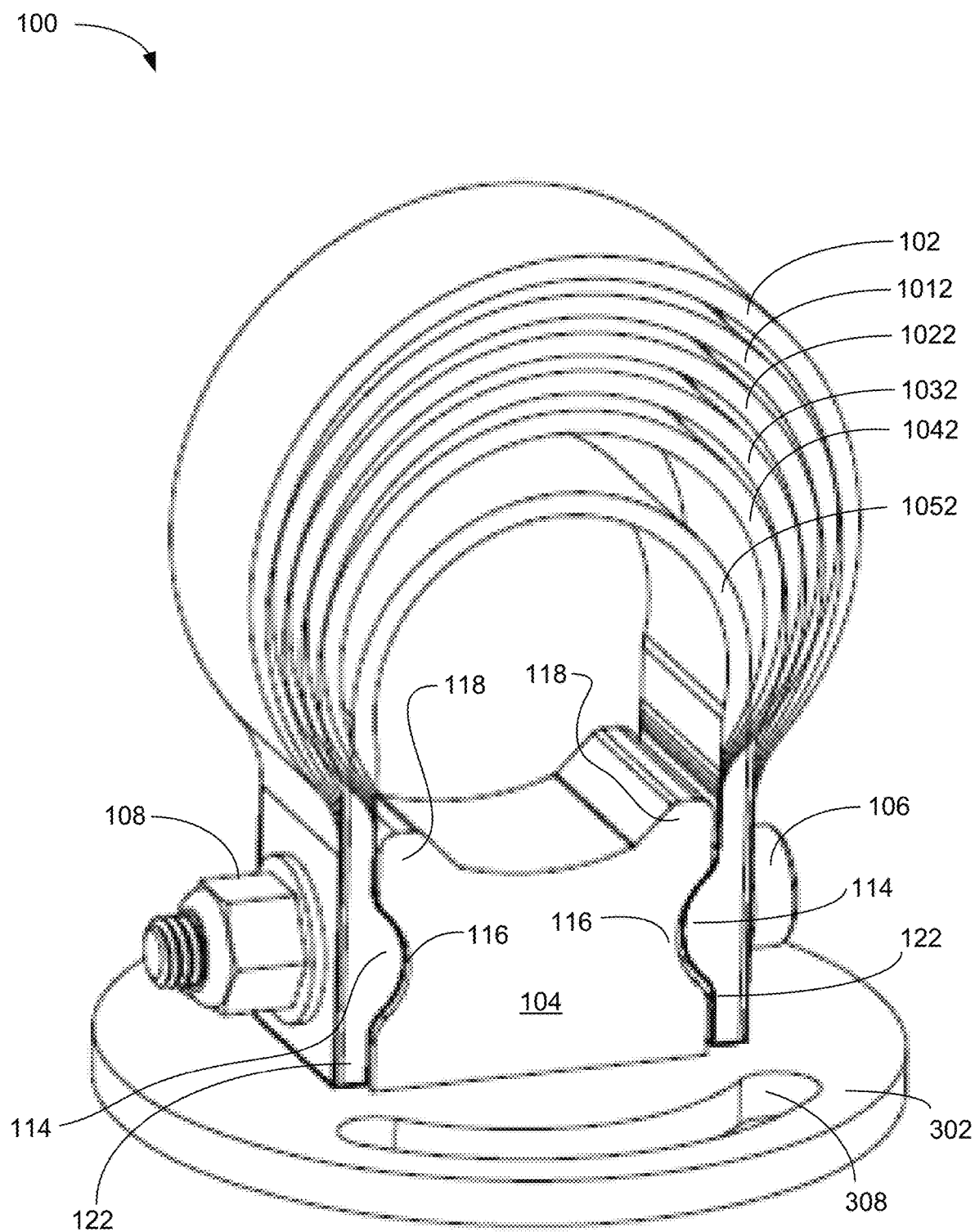
FIG. 10 is a front perspective view illustrating the exemplary embodiment of the speaker bracket of FIG. 1 with straps of various sizes, according to a preferred embodiment of the present invention.

FIG. 10 is a front perspective view illustrating the exemplary embodiment of the speaker bracket 100 of FIG. 1 with straps of various sizes, according to a preferred embodiment of the present invention. A novel feature of the present invention is that the clamp base 104, strap ends 122, clamp bolt 106, and adapter 302 can be used with any of straps 102, 1012, 1022, 1032, 1042, and 1052, though of course, not at the same time. Yet even larger straps may be used with larger clamp bases 104, where the larger clamp base 104 shape is the same shape as illustrated for clamp base 104.

FIG. 11 is a front elevation view illustrating a second exemplary embodiment of a dual speaker bracket 1100, according to a preferred embodiment of the present invention. Dual speaker bracket 1100 includes a speaker strap 1150. Speaker bracket 1100 begins similarly to speaker bracket 100, with strap 102, strap ends 122, and clamp base 1104, which is like clamp base 104, but with legs 1120 that end in rounded portions 1122, as shown. Legs 1120 have pivot bores 1210 (see FIG. 12) aligned with a pivot block bore 1212 (see FIG. 12) through pivot block 1124 through which pivot bolt 1132 extends to engage pivot nut 1134. Pivot bolt 1132 can be loosened to allow pivoting and tightened to lock the joint into position. Pivot block 1124 has a semi-cylindrical portion 1128, a screw divot 1126 in the semi-cylindrical portion 1128, and flat-sided portion 1130 extending from the semi-cylindrical portion 1128. As will be described more fully below, pivot block 1124 rotates relative to strap base 1136 about what would be a vertical axis in the plane of FIG. 11, such as the axis of screw 1206. Pivot head 1146 in recess 1148 rotates with pivot block 1124. Pivot block 1124 also rotates about pivot bolt 1132, creating a doubly articulated joint. Strap base 1136 extends into speaker strap 1138 and to strap end 1140. Strap end 1140 has a strap end bore 1218 (see FIG. 12) that aligns to a threaded bore 1220 (see FIG. 12) in strap base 1136 to receive second clamping bolt 1144 with head 1142.

Figure 12:
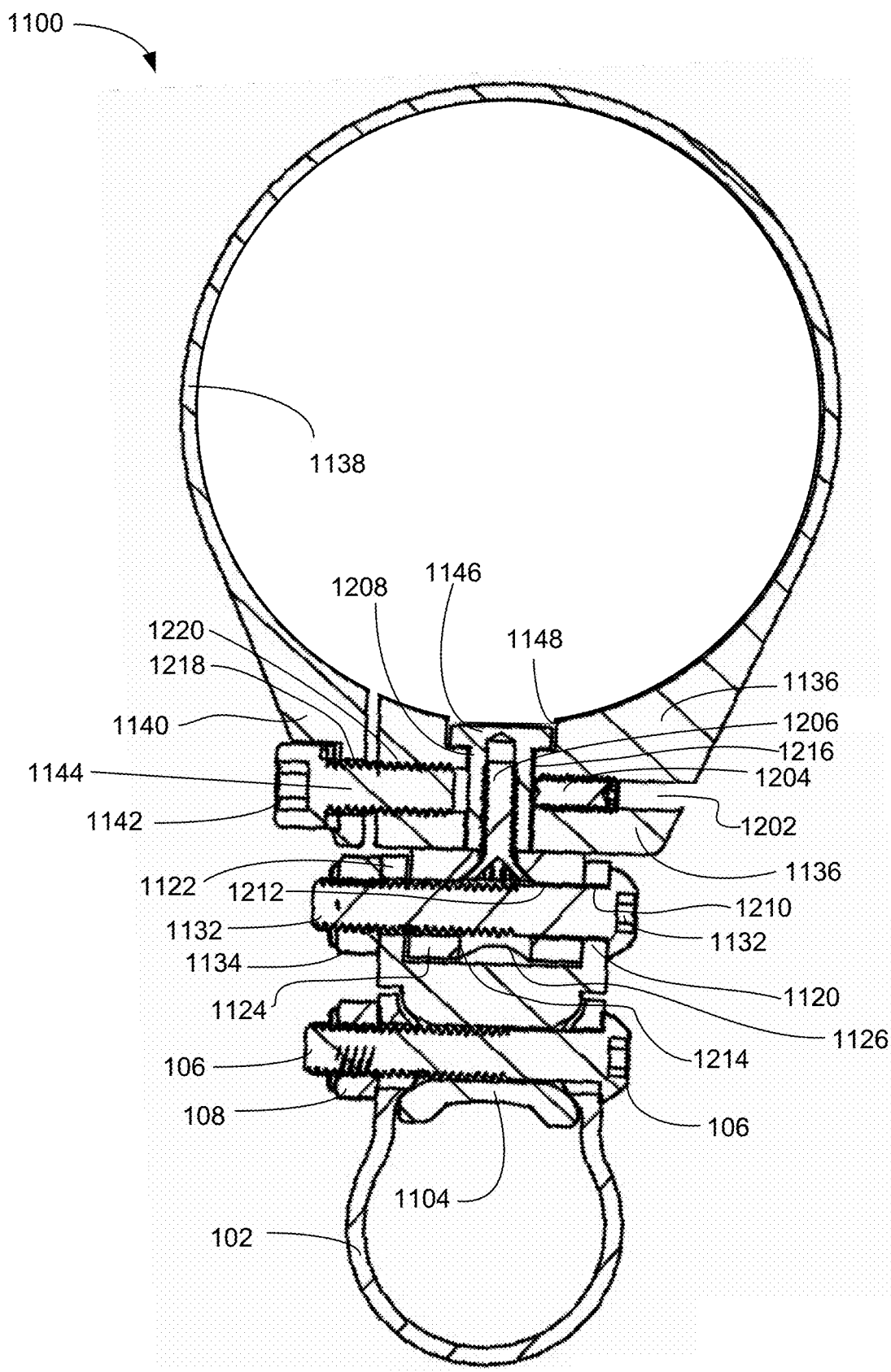
FIG. 12 is a front cross-sectional elevation view illustrating the second exemplary embodiment of the dual speaker bracket of FIG. 11, according to a preferred embodiment of the present invention.

FIG. 12 is a front cross-sectional elevation view illustrating the second exemplary embodiment of the dual speaker bracket 1100 of FIG. 11, according to a preferred embodiment of the present invention. Second clamping bolt 1144 clamps strap end 1140 to strap base 1136. Head 1146 is the head of a smooth cylinder 1208 into which a screw 1206 (or similarly effective fastener) captive in pivot block 1124, is fixedly threaded. Rotation of the smooth cylinder 1208 may be prevented by advancing set screw 1204 in bore 1202 in strap base 1136, as shown. Smooth cylinder 1208 is inserted into a complimentary vertical cavity 1216, or strap base through-bore 1216, in strap base 1136 during assembly, and captive screw 1206 fastens pivot block 1124 to smooth cylinder 1208 for concurrent rotational adjustment. Screw 1206 is made captive in that it is first inserted into pivot block through a bore 1214 leading from screw divot 1126, is tightened in smooth cylinder 1208, and then pivot bolt 1132 is inserted through legs 1120 and pivot block 1124, thereby capturing screw 1206.

FIG. 13 is a front perspective view illustrating the second exemplary embodiment of the dual speaker bracket 1100 of FIG. 11 installed on a first type of handle bars 1302, according to a preferred embodiment of the present invention. Speaker brackets 1100 are shown in a doubly articulated configuration with straps 1138 holding cylindrical speaker 1304 securely in place. Cylindrical speaker 1304 has a housing 1306, a grill 1308, and a control section 1310. Handlebars 1302 are illustrative of any situation where two generally proximate supports are used to support a speaker 1304.

Figure 14:
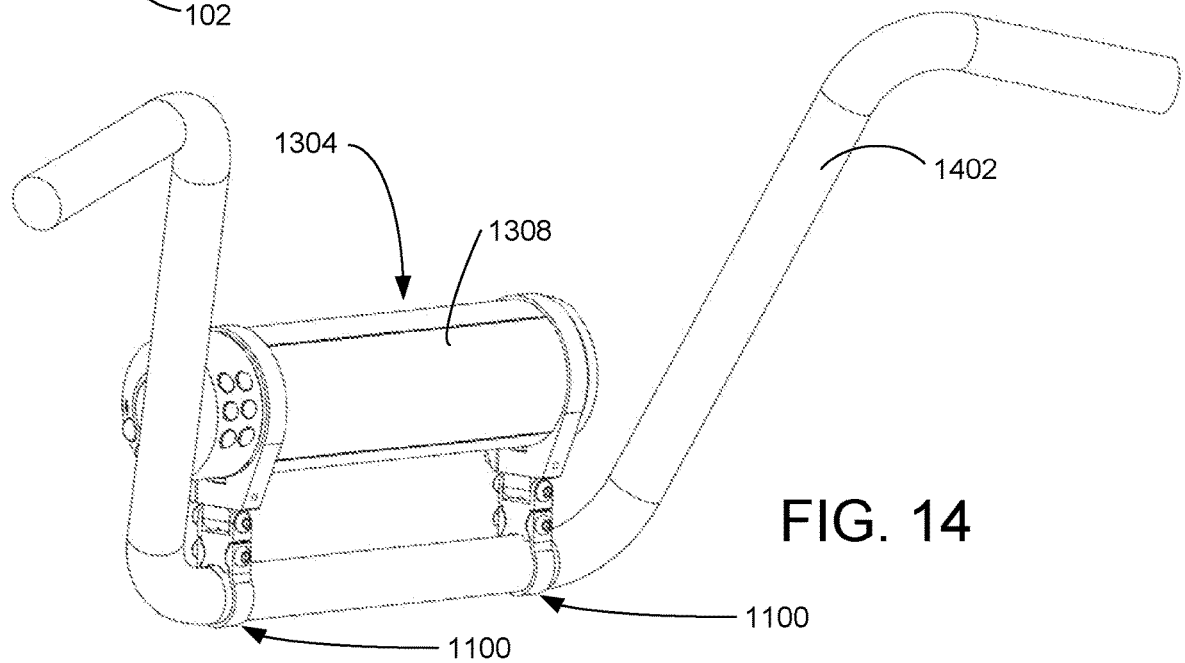
FIG. 14 is a front perspective view illustrating the second exemplary embodiment of the dual speaker bracket of FIG. 11 installed on a second type of handle bars, according to a preferred embodiment of the present invention.

FIG. 14 is a front perspective view illustrating the second exemplary embodiment of the dual speaker bracket 1100 of FIG. 11 installed on a second type of handle bars 1402, according to a preferred embodiment of the present invention. The speaker brackets 1100 are shown in a non-articulated configuration. Handlebars 1402 are illustrative of any situation where a speaker 1304 is to be supported on a single, substantially straight support.

Figure 15:
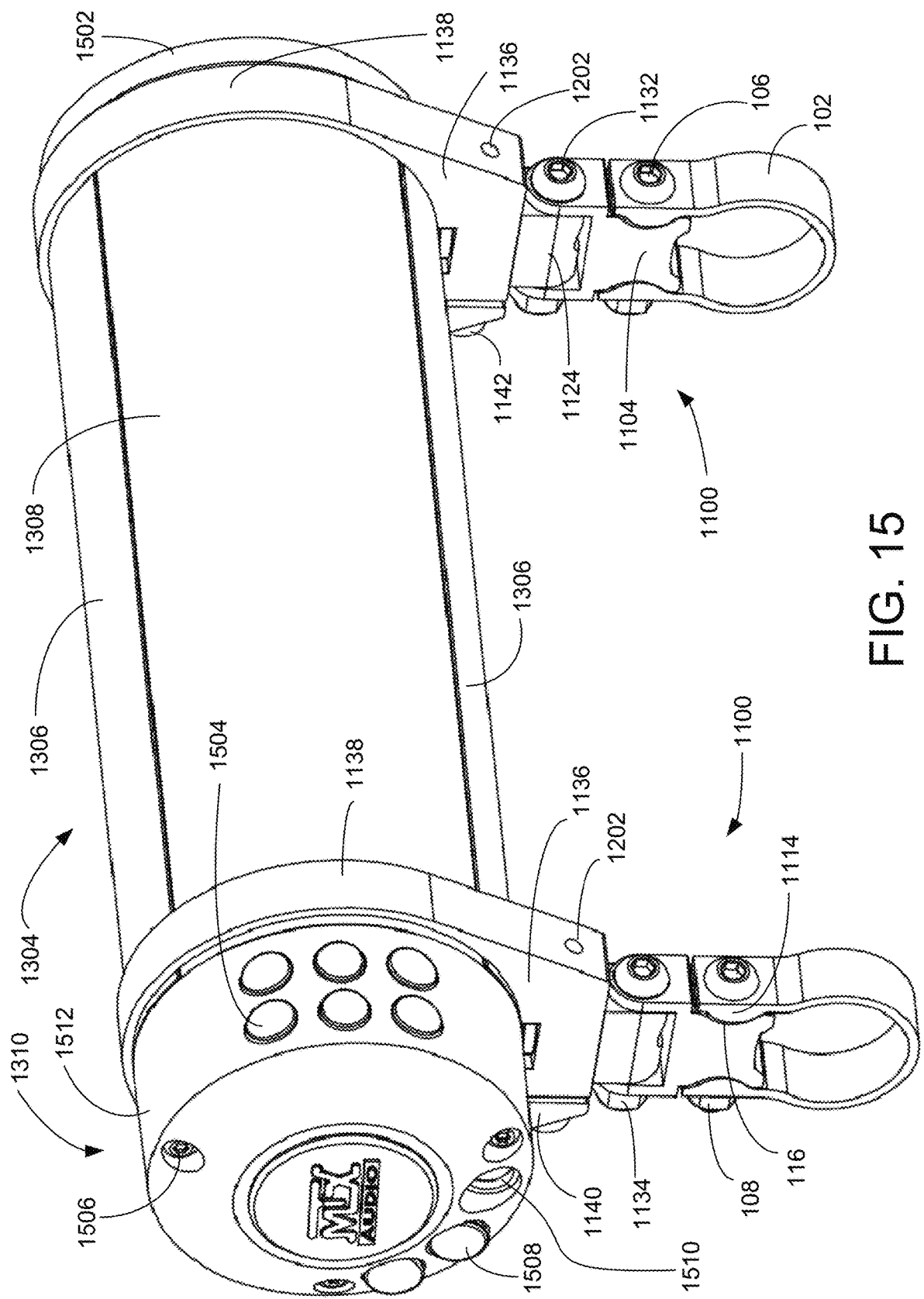
FIG. 15 is a front-side perspective view illustrating the second exemplary embodiment of the dual speaker bracket of FIG. 11 installed on a cylindrical speaker as shown in FIG. 14, according to a preferred embodiment of the present invention.

FIG. 15 is a front-side perspective view illustrating the second exemplary embodiment of the dual speaker bracket 1100 of FIG. 11 installed on a cylindrical speaker 1304 as shown in FIG. 14, according to a preferred embodiment of the present invention. Control section 1310 has a first end cap 1512 supporting three fastener features 1506 (one of three labeled), AUX input and AUX output 1508 (one of two labeled) are shown with water resistant covers, a power input coupling 1510, and six Blue Tooth control selector buttons 1504 (one of six labeled). In other embodiments, the placement and number of buttons may vary. Second end cap 1502 closes the opposing end of cylindrical speaker 1304.

Figure 16:
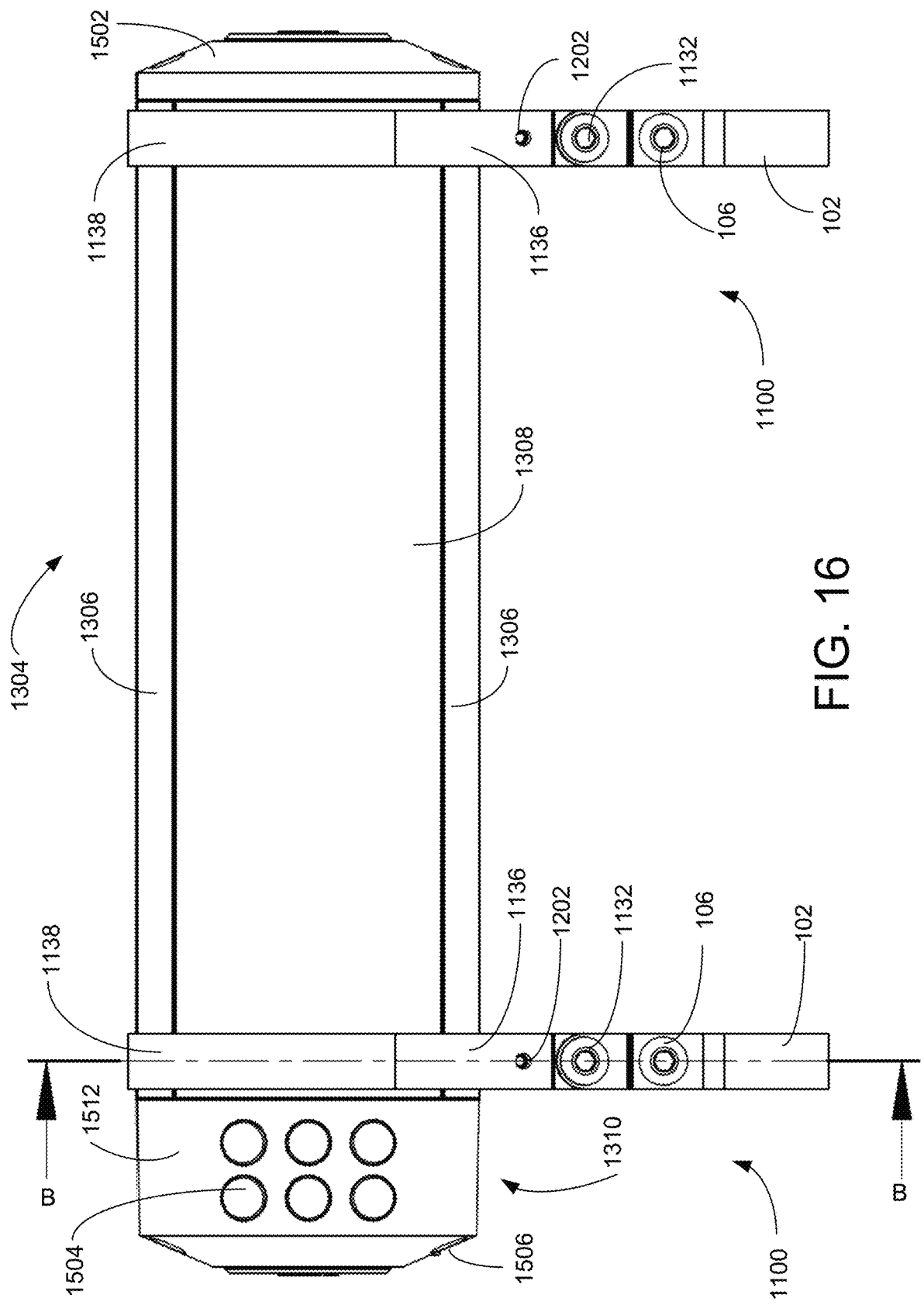
FIG. 16 is a side elevation view illustrating the second exemplary embodiment of the dual speaker bracket of FIG. 11 installed on a cylindrical speaker as shown in FIG. 14 and defining cross section BB, according to a preferred embodiment of the present invention.

FIG. 16 is a side elevation view illustrating the second exemplary embodiment of the dual speaker bracket 1100 of FIG. 11 installed on a cylindrical speaker 1304 as shown in FIG. 14 and defining cross section BB, according to a preferred embodiment of the present invention. Speaker straps 1138 engage the speaker housing 1306 and the grill 1308, but not the first end cap 1512 nor the second end cap 1502. Excluding the speaker 1304, the cross section BB is shown in FIG. 12.

Figure 17:
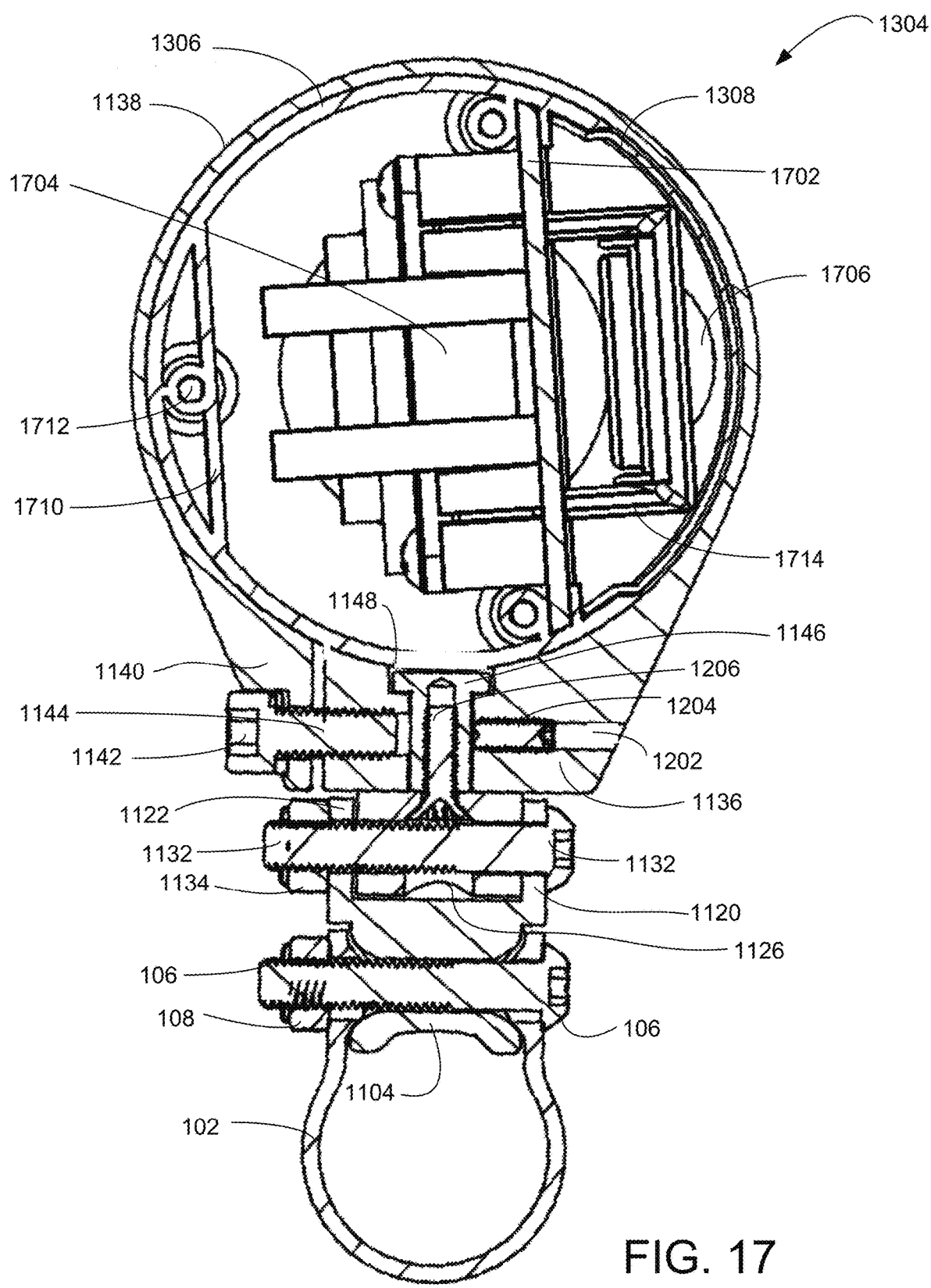
FIG. 17 is a cross sectional view through section BB illustrating the second exemplary embodiment of the dual speaker bracket of FIG. 11 installed on a cylindrical speaker as shown in FIG. 14, according to a preferred embodiment of the present invention.

FIG. 17 is a cross sectional view through section BB illustrating the second exemplary embodiment of the dual speaker bracket 1100 of FIG. 11 installed on a cylindrical speaker 1304 as shown in FIG. 14, according to a preferred embodiment of the present invention. First acoustic driver (hereinafter "driver") 1704 is a woofer mounted on support panel 1702 as is frame 1714. Second driver 1706, a tweeter, is supported by frame 1714. Fastener receivers 1712 (one of three labeled) are reinforced, as with panels 1710 and 1702, as shown, and align to fastener features 1506 during assembly. In a preferred embodiment there are two woofers 1704 (one behind the other in this view) and four tweeters 1706 (three behind one, in this view).

Figure 18:
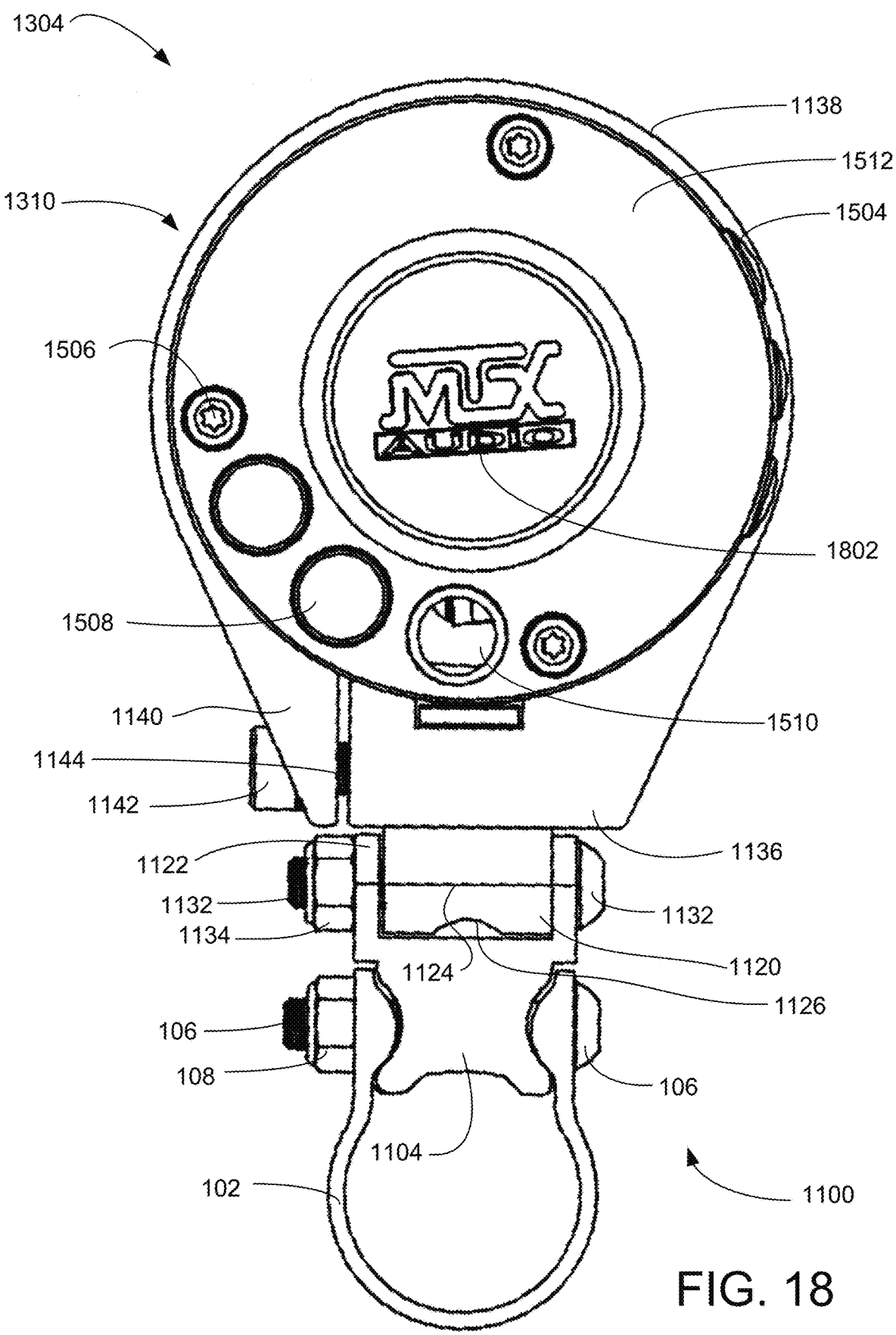
FIG. 18 is an end elevation view illustrating the second exemplary embodiment of the dual speaker bracket of FIG. 11 installed on a cylindrical speaker as shown in FIG. 14, according to a preferred embodiment of the present invention.

FIG. 18 is an end elevation view illustrating the second exemplary embodiment of the dual speaker bracket 1100 of FIG. 11 installed on a cylindrical speaker 1304 as shown in FIG. 14, according to a preferred embodiment of the present invention. Logo panel 1802 may be molded into first end cap 1512 or may be made separately and affixed by adhesion or similarly effective means.

Figure 19:
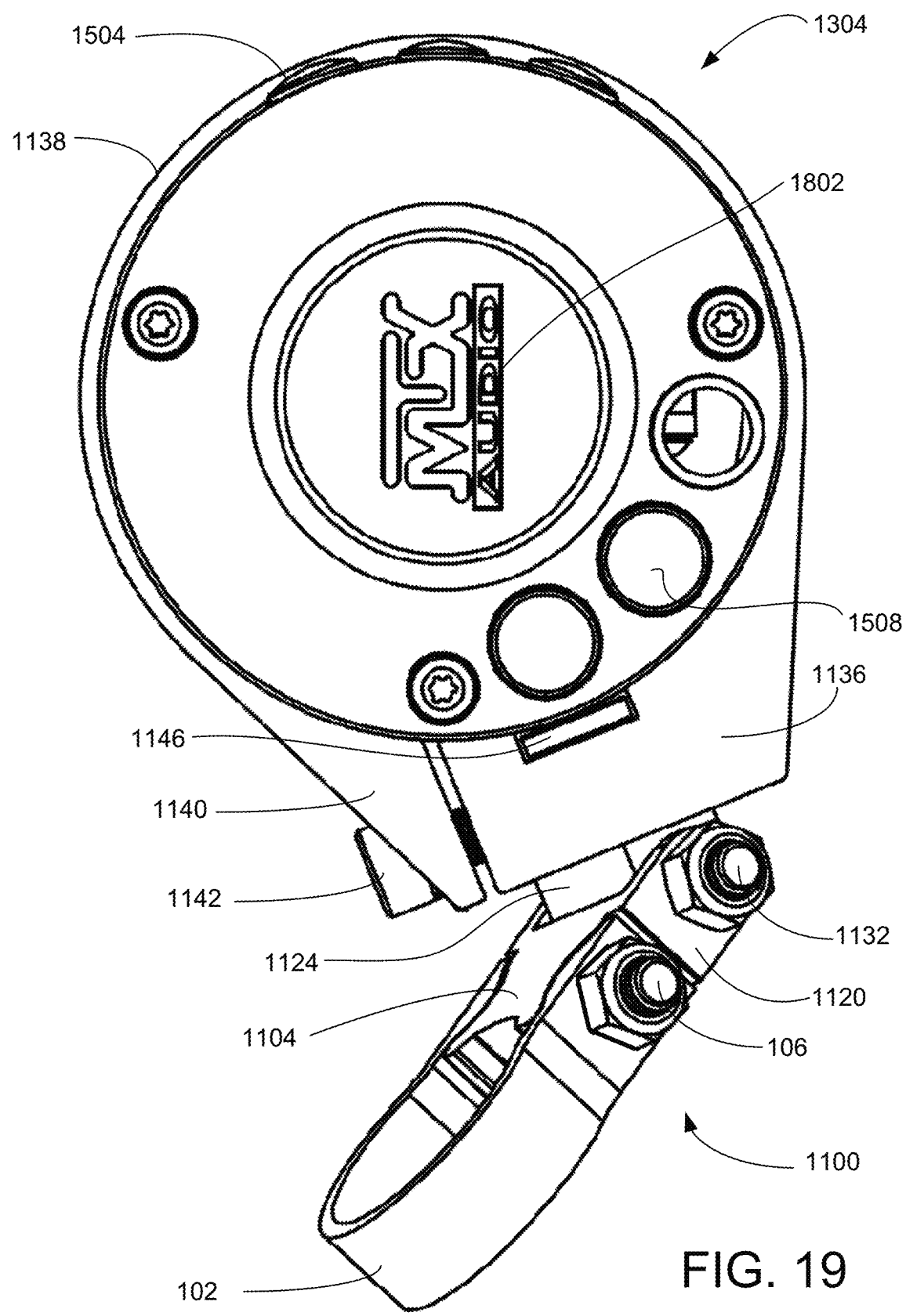
FIG. 19 is an end elevation view illustrating the second exemplary embodiment of the dual speaker bracket of FIG.

FIG. 19 is an end elevation view illustrating the second exemplary embodiment of the dual speaker bracket 1100 of FIG. 11 installed on a cylindrical speaker 1304 as shown in FIG. 13, according to a preferred embodiment of the present invention. Speaker brackets 1100 are shown doubly articulated in that there is rotation about pivot bolt 1132 and pivot block 1124. Clamp base 1104 is pivoted relative to clamp block 1124 about pivot bolt 1132 and pivot block 1124 is articulated by rotation with respect to strap base 1136.

FIG. 20 is a bottom plan view illustrating the second exemplary embodiment of the dual speaker bracket 1100 of FIG. 11 installed on a cylindrical speaker 1304 as shown in FIG. 13 and defining cross section CC, according to a preferred embodiment of the present invention. A portion of pivot bolt 1132 can be seen crossing the bore that the screw divot 1126 initiates.

FIG. 21 is a cross sectional view through section CC illustrating the second exemplary embodiment of the dual speaker bracket 1100 of FIG. 11 installed on a cylindrical speaker 1304 as shown in FIG. 13, according to a preferred embodiment of the present invention. Inside cylindrical speaker 1304, a reinforcing panel 2102 supports pushbuttons, such as 1508. Recess 2104 receives with head 1142 of second clamping bolt 1144 and may receive a lock washer as well, to compensate for the lack of a nut.

We claim:

1. A speaker bracket comprising:
   a. a clamp base having first and second semi-cylindrical grooves on first and second opposing sides, respectively;
   b. first and second arms, adapted to receive a support, extending from first and second opposing ends of a third side of said clamp base, wherein said third side extends between said first and second opposing sides;
   c. a fourth side, opposed to said third side, and extending between said first and second opposing sides;
   d. a resilient arcuate clamp strap adapted to enclose and secure a support, comprising opposing spaced-apart first and second clamping ends, defining an inward space there between, said first and second clamping ends further comprising:
      i. respective first and second opposed flat inwardly-facing surfaces;
      ii. respective first and second semi-cylindrical protrusions extending inwardly from first and second middle portions of said respective first and second opposed flat inwardly-facing surfaces and adapted to conform to, and align to, said first and second semi-cylindrical grooves of said damp base, respectively; and
      iii. respective first and second flat outwardly-facing surfaces on respective first and second outward sides of said respective said first and second clamping ends, wherein the inwardly-facing flat surfaces and the outwardly-facing flat surfaces are substantially parallel;
   e. first and second opposed discreet legs extending perpendicularly from opposing ends of said fourth side of said damp base;
   f. said first and second legs having respective first and second rounded ends; and
   g. first and second pivot bores in respective said first and second legs.

2. The speaker bracket of claim 1, comprising:
   a. a clamp base through-bore in said clamp base extending between said first and second semi-cylindrical grooves;
   b. first and second clamp strap end bores extending through respective said first and second semi-cylindrical protrusions and alignable to said clamp base through-bore in a clamping configuration; and
   c. an at least partially threaded clamp bolt, sized and configured to slidingly fit through said first clamp strap end bore, said clamp base through-bore, and said second clamp strap end bore and to be fastened with a nut.

3. The speaker bracket of claim 2, comprising a pivot block configured to slidingly rotate between said first and second legs and having:
   a. a semi-cylindrical portion proximate said clamp base;
   b. a flat-sided portion extending distally from said semi-cylindrical portion;
   c. a pivot block bore alignable with said first and second pivot bores;
   d. a fastener access bore oriented within and transverse to said pivot block bore;
   e. a fastener divot at an opening of said fastener access bore, proximal said clamp base;
   f. a narrowed retainer portion of said fastener access bore; and
   g. an at least partially threaded pivot bolt sized to slidingly fit through said first pivot bore, said pivot block bore, and said second pivot bore, and adapted to be one of tightly fastened for clamping and loosely fastened for pivoting.

4. The speaker bracket of claim 3, comprising a speaker strap further comprising:
   a. a strap base, a strap extending from said strap base, and a strap end extending from said strap, all comprising one piece;
   b. a strap base threaded bore in said strap base alignable to a strap end bore in said strap end for receiving a first fastener adapted to clamp said strap end to said strap base;
   c. a strap end recess in said strap end adapted to receive a head of said first fastener;
   d. a smooth strap base bore through said strap base oriented transverse to said strap base threaded bore;
   e. a recess in said strap base at an upper end of said smooth strap base bore; and
   f. an at least partially threaded set screw bore extending into a side of said strap base to said smooth strap base bore.

5. The speaker bracket of claim 4, comprising an externally smooth cylinder configured to slidingly rotate within said smooth strap base bore, further comprising:
   a. a head portion of said externally smooth cylinder, comprising a wider diameter than said externally smooth cylinder, configured to slidingly rotate within said recess; and
   b. a threaded central axial bore within said externally smooth cylinder.

6. The speaker bracket of claim 5, comprising:
   a. said first fastener adapted to extend through said strap end bore and into said strap base threaded bore;
   b. a second fastener adapted to extend from said narrowed receiver portion of said fastener access bore to engage said threaded central axial bore within said externally smooth cylinder; and
   c. a set screw, adapted to be engaged in said set screw bore to one of prevent said externally smooth cylinder from rotating and allow said externally smooth cylinder to rotate.

7. The speaker bracket of claim 6, comprising said speaker bracket combined with a cylindrical loudspeaker assembly enclosed within said strap and said strap base.

8. The speaker bracket of claim 1, further comprising:
   a. wherein the first and second opposing sides of said clamp base each comprise an outwardly facing surface comprising first and second flat portions on respective sides of each of the semi-cylindrical grooves; and
   b. first and second portions of each said opposed flat inwardly-facing surface of respective said clamp strap ends are adjacent to top and bottom edges, respectively, of respective said first and second semi-cylindrical protrusions.

9. A speaker bracket comprising:
a. a clamp base having first and second semi-cylindrical grooves on first and second opposing sides, respectively;
b. first and second arms, adapted to receive a support, extending from first and second opposing ends of a third side of said clamp base, wherein said third side extends between said first and second opposing sides;
c. a fourth side, opposed to said third side, and extending between said first and second opposing sides;
d. a resilient arcuate clamp strap comprising opposing spaced-apart first and second clamping ends, defining an inward space there between, said first and second clamping ends further comprising:
   i. respective first and second opposed flat inwardly-facing surfaces;
   ii. respective first and second semi-cylindrical protrusions extending inwardly from first and second middle portions of said respective first and second opposed flat inwardly-facing surfaces and adapted to conform to, and align to, said first and second semi-cylindrical grooves of said clamp base, respectively; and
   iii. respective first and second flat outwardly-facing surfaces on respective first and second outward sides of said respective said first and second clamping ends, wherein said inwardly-facing flat surfaces and said outwardly-facing flat surfaces are substantially parallel;
e. a clamp base through-bore in said clamp base extending between said first and second semi-cylindrical grooves;
f. first and second strap end bores extending through respective said first and second semi-cylindrical protrusions and alignable to said clamp base through-bore in a clamping configuration; and
g. an at least partially threaded clamp bolt, sized and configured to slidingly fit through said first strap end bore, said clamp base through-bore, and said second strap end bore and to be fastened with a nut;
h. first and second opposed discreet legs extending perpendicularly from opposing ends of said fourth side of said clamp base;
i. said first and second legs having respective first and second rounded ends; and
j. first and second pivot bores in respective said first and second legs.

10. The speaker bracket of claim 9, further comprising:
a. wherein the first and second opposing sides of said clamp base each comprise an outwardly facing surface comprising first and second flat portions on respective sides of each of the semi-cylindrical grooves; and
b. first and second portions of each said opposed flat inwardly-facing surface of respective said damp strap ends are adjacent to top and bottom edges, respectively, of respective said first and second semi-cylindrical protrusions.

11. The speaker bracket of claim 9, comprising:
a. a pivot block configured to slidingly rotate between said first and second legs and having:
   i. a semi-cylindrical portion proximate said clamp base;
   ii. a flat-sided portion extending distally from said semi-cylindrical portion;
   iii. a pivot block bore alignable with said first and second pivot bores;
   iv. a fastener access bore oriented within and transverse to said pivot block bore;
   v. a fastener divot at an opening of said fastener access bore, proximal said clamp base;
   vi. a narrowed receiver portion of said fastener access bore; and
   vii. an at least partially threaded pivot bolt sized to slidingly fit through said first pivot bore, said pivot block bore, and said second pivot bore and adapted to be one of tightly fastened for clamping and loosely fastened for pivoting.

12. The speaker bracket of claim 11, comprising a speaker strap further comprising:
a. a strap base, a strap extending from said strap base, and a strap end extending from said strap, all comprising one piece;
b. a strap base threaded bore in said strap base alignable to a strap end bore in said strap end for receiving a first fastener adapted to clamp said strap end to said strap base;
c. a strap end recess in said strap end adapted to receive a head of said first fastener;
d. a smooth strap base bore through said strap base oriented transverse to said strap base threaded bore;
e. a recess in said strap base at an upper end of said smooth strap base bore; and
f. an at least partially threaded set screw bore extending into a side of said strap base to said smooth strap base bore.

13. The speaker bracket of claim 12, comprising an externally smooth cylinder configured to slidingly rotate within said smooth strap base bore, further comprising:
a. a head portion of said externally smooth cylinder, comprising a wider diameter than said externally smooth cylinder, configured to slidingly rotate within said recess;
b. a threaded central axial bore within said externally smooth cylinder;
c. said first fastener adapted to extend through said strap end bore and into said strap base threaded bore;
d. a second fastener adapted to extend from said narrowed receiver portion of said fastener access bore to engage said threaded central axial bore within said externally smooth cylinder; and
e. a set screw, adapted to be engaged in said set screw bore to one of prevent said externally smooth cylinder from rotating and allow said externally smooth cylinder to rotate.

14. A speaker bracket comprising:
a. a clamp base having first and second semi-cylindrical grooves on first and second opposing sides, respectively;
b. first and second arms, adapted to receive a support, extending from first and second opposing ends of a third side of said clamp base, wherein said third side extends between said first and second opposing sides;
c. a fourth side, opposed to said third side, and extending between said first and second opposing skies;
d. a resilient arcuate clamp strap comprising opposing spaced-apart first and second clamping ends, defining an inward space there between, said first and second clamping ends further comprising:
   i. respective first and second opposed flat inwardly-facing surfaces;
   ii. respective first and second semi-cylindrical protrusions extending inwardly from first and second middle portions of said respective first and second opposed flat inwardly-facing surfaces and adapted to conform to, and align to, said first and second semi-cylindrical grooves of said clamp base, respectively; and iii. respective first and second flat outwardly-facing surfaces on respective first and second outward sides of said respective said first and second clamping ends, wherein said inwardly-facing flat surfaces and said outwardly-facing flat surfaces are substantially parallel;

e. a clamp base through-bore in said clamp base extending between said first and second semi-cylindrical grooves;

f. first and second clamp strap end bores extending through respective said first and second semi-cylindrical protrusions and alignable to said clamp base through-bore in a clamping configuration;

g. an at least partially threaded clamp bolt, sized and configured to slidingly fit through said first clamp strap end bore, said clamp base through-bore, and said second clamp strap end bore and to be fastened with a nut;

h. the first and second opposing sides of said clamp base each comprise an outwardly facing surface comprising first and second flat portions on respective sides of each of the semi-cylindrical grooves;

i. first and second portions of each said opposed flat inwardly-facing surface of respective said clamp strap ends are adjacent to top and bottom edges, respectively, of respective said first and second semi-cylindrical protrusions;

j. first and second opposed discreet legs extending perpendicularly from opposing ends of said fourth side of said clamp base;

k. said first and second legs having respective first and second rounded ends; and l. first and second pivot bores in respective said first and second legs.

15. The speaker bracket of claim 14, comprising:
a. first and second opposed discrete legs extending perpendicularly from opposing ends of said fourth side of said clamp base;
b. said first and second legs having respective first and second rounded ends;
c. first and second pivot bores in respective said first and second legs;
d. a pivot block configured to slidingly rotate between said first and second legs and having:
  i. a semi-cylindrical portion proximate said clamp base;
  ii. a flat-sided portion extending distally from said semi-cylindrical portion;
  iii. a pivot block bore alignable with said first and second pivot bores;
  iv. a fastener access bore oriented transverse to said pivot block bore;
  v. a fastener divot at an opening of said fastener access bore, proximal said clamp base;
  vi. a narrowed receiver portion of said fastener access bore;
  vii. an at least partially threaded pivot bolt sized to slidingly fit through said first pivot bore, said pivot block bore, and said second pivot bore and adapted to be one of tightly fastened for clamping and loosely fastened for pivoting;
e. a speaker strap assembly further comprising:
  i. a strap base, a strap extending from said strap base, and a strap end extending from said strap, all comprising one piece;
  ii. a strap base threaded bore in said strap base alignable to a strap end bore in said strap end for receiving a first fastener adapted to clamp said strap end to said strap base;
  iii. a strap end recess in said strap end adapted to receive a head of said first fastener;
  iv. a smooth strap base bore through said strap base oriented transverse to said strap base threaded bore;
  v. a recess in said strap base at an upper end of said smooth strap base bore;
  vi. an at least partially threaded set screw bore extending into a side of said strap base to said smooth strap base bore;
  vii. an externally smooth cylinder configured to slidingly rotate within said smooth strap base bore, further comprising:
    1. a head portion of said externally smooth cylinder, comprising a wider diameter than said externally smooth cylinder, configured to slidingly rotate within said recess;
    2. a threaded central axial bore within said externally smooth cylinder;
    3. said first fastener adapted to extend through said strap end bore and into said strap base threaded bore;
    4. a second fastener adapted to extend from said narrowed receiver portion of said fastener access bore to engage said threaded central axial bore within said externally smooth cylinder; and
    5. a set screw, adapted to be engaged in said set screw bore to one of prevent said externally smooth cylinder from rotating and allow said externally smooth cylinder to rotate.

16. A speaker bracket comprising:
a. a clamp base having first and second semi-cylindrical grooves on first and second opposing sides, respectively;
b. first and second arms, adapted to receive a support, extending from first and second opposing ends of a third side of said clamp base, wherein said third side extends between said first and second opposing sides;
c. a fourth side, opposed to said third side, and extending between said first and second opposing sides;
d. a resilient arcuate clamp strap comprising opposing spaced-apart first and second clamping ends, defining an inward space there between, said first and second clamping ends further comprising:
  i. respective first and second opposed flat inwardly-facing surfaces;
  ii. respective first and second semi-cylindrical protrusions extending inwardly from first and second middle portions of said respective first and second opposed flat inwardly-facing surfaces and adapted to conform to, and align to, said first and second semi-cylindrical grooves of said clamp base, respectively; and
  iii. respective first and second flat outwardly-facing surfaces on respective first and second outward sides of said respective said first and second clamping ends, wherein said inwardly-facing flat surfaces and said outwardly-facing flat surfaces are substantially parallel;
e. a clamp base through-bore in said clamp base extending between said first and second semi-cylindrical grooves;
f. first and second clamp strap end bores extending through respective said first and second semi-cylindrical protrusions and alignable to said clamp base through-bore in a clamping configuration;
g. an at least partially threaded clamp bolt, sized and configured to slidingly fit through said first clamp strap end bore, said clamp base through-bore, and said second clamp strap end bore and to be fastened with a nut;
h. the first and second opposing sides of said clamp base each comprise an outwardly facing surface comprising first and second flat portions on respective sides of each of the semi-cylindrical grooves;
i. first and second portions of each said opposed flat inwardly-facing surface of respective said clamp strap ends are adjacent to top and bottom edges, respectively, of respective said first and second semi-cylindrical protrusions;
j. a plurality of threaded fastener holes in said fourth side extending inwardly no further than to said clamp base through-bore; and
k. an adaptor:
  i. fastenable to said clamp base via a plurality of screws into said respective plurality of threaded fastener holes; and
  ii. having at least one arcuate slot adapted to receive fasteners for fastening said adapter to at least one of a loudspeaker, a loudspeaker housing, and a loudspeaker frame.

* * * * *